United States Patent
Schrage

(10) Patent No.: US 6,955,701 B2
(45) Date of Patent: Oct. 18, 2005

(54) FILTER ELEMENT AND USE THEREOF; METHODS OF MANUFACTURE

(75) Inventor: Kevin J. Schrage, Spring Valley, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 183 days.

(21) Appl. No.: 10/112,097

(22) Filed: Mar. 28, 2002

(65) Prior Publication Data

US 2003/0182911 A1 Oct. 2, 2003

(51) Int. Cl.[7] .............................................. B01D 46/02
(52) U.S. Cl. .......................... 55/498; 55/499; 55/502; 55/521; 55/DIG. 5; 264/257; 264/271.1; 264/299; 264/DIG. 48
(58) Field of Search ........................ 55/385.1, 385.3, 55/498, 499, 502, 503, 510, 521, DIG. 5; 95/273; 264/239, 257, 263, 271.1, 299, DIG. 48; 123/198 E

(56) References Cited

U.S. PATENT DOCUMENTS

| | | | |
|---|---|---|---|
| 2,962,121 A | 11/1960 | Wilber | |
| 3,147,100 A | 9/1964 | Wilber | |
| 3,469,707 A | 9/1969 | Humbert, Jr. et al. | |
| 3,692,184 A | * 9/1972 | Miller et al. | 55/510 |
| 4,452,614 A | 6/1984 | Kovac | |
| 4,615,804 A | 10/1986 | Wright | |
| 4,720,292 A | 1/1988 | Engel et al. | |
| 4,801,383 A | 1/1989 | Hoffmann et al. | |
| 5,024,870 A | * 6/1991 | Jackson | 55/510 |
| 5,066,400 A | 11/1991 | Rocklitz et al. | |
| 5,350,515 A | * 9/1994 | Stark et al. | 264/DIG. 48 |
| 5,415,677 A | 5/1995 | Ager et al. | |
| 5,443,721 A | 8/1995 | Kelada et al. | |
| 5,484,466 A | * 1/1996 | Brown et al. | 55/498 |
| 5,547,480 A | * 8/1996 | Coulonvaux | 55/498 |
| 5,556,440 A | 9/1996 | Mullins et al. | |
| 5,730,769 A | * 3/1998 | Dungs et al. | 55/510 |
| 5,755,843 A | 5/1998 | Sundquist | |
| 5,803,941 A | * 9/1998 | Berkhoel et al. | 55/510 |
| D401,306 S | 11/1998 | Ward et al. | |
| 5,882,367 A | 3/1999 | Morgan et al. | |
| 5,891,337 A | * 4/1999 | Keller et al. | 55/510 |
| 5,935,281 A | * 8/1999 | Rotheiser et al. | 55/510 |
| 5,938,804 A | 8/1999 | Engel et al. | |
| D416,308 S | 11/1999 | Ward et al. | |
| 6,039,778 A | 3/2000 | Coulonvaux | |
| 6,599,342 B2 | * 7/2003 | Andress et al. | 55/510 |

FOREIGN PATENT DOCUMENTS

| | | |
|---|---|---|
| DE | 30 01 674 A1 | 7/1981 |
| EP | 0 329 659 B1 | 8/1989 |
| GB | 2 005 777 A | 4/1973 |
| GB | 1 499 922 | 2/1978 |
| WO | WO 99/14483 | 3/1999 |
| WO | WO 99/42719 | 8/1999 |
| WO | WO 99/47237 | 9/1999 |

OTHER PUBLICATIONS

Declaration regarding Prior Art Blue Filter, Exhibits 1A, 1B, 1C.

Declaration regarding Prior Art Orange Filter, Exhibits 2A, 2B, 2C.

* cited by examiner

Primary Examiner—Duane Smith
Assistant Examiner—Jason M. Greene
(74) Attorney, Agent, or Firm—Merchant & Gould P.C.

(57) ABSTRACT

An improved filter element is provided. In preferred form, the filter element includes first and second end caps, with media extending therebetween. The end caps are preferably formed from foamed polyurethane, and preferably there are no outer peripheral standoff indents provided in the end caps. Each end cap preferably includes a standoff ring, spaced from an outer perimeter, positioned therein. Preferred approaches to manufacturing such elements are provided.

17 Claims, 12 Drawing Sheets

FILTER ELEMENT AND USE THEREOF; METHODS OF MANUFACTURE

FIELD OF THE INVENTION

The present invention relates to filter elements. The constructions and techniques described herein particularly concern improved filter elements for use in air cleaners, such as air cleaners for: cleaning air flow to engines, compressors and turbines; and/or, cleaning air from industrial processes. The techniques described herein also concern the use of such elements and improved methods of manufacture.

BACKGROUND

In general, it is preferred that various gas flow streams be filtered, by passage through a filter element including gas permeable filter media. For example, the combustion air directed into an internal combustion engine is generally directed through an air cleaner including a filter element, before the air is directed into the engine air intake. Other examples of air flow filtration include filtration of air flow into compressors and filtration of air flow into gas turbines. In addition, gas or air flow in industrial environments generally needs to be purified by filtration, for example by passage through dust collectors or other air cleaner arrangements, before it is recirculated or vented to the atmosphere.

In general, the air filtration or air cleaner systems for such uses include one or more replaceable air filter elements therein. After a new air filter element is installed, the air cleaner air filtration system is placed on-line and is operated by directing air flow to be filtered through the filter media of the filter element, with deposition on the filter element of particulate material carried in the air stream. In time, increasing deposition of particulate material on the filter element leads to an increased restriction to air flow through the system, until an operating maximum, or system service point, is reached, at which time the air cleaner system is taken off-line, and the air filter element is removed and is either refurbished or is replaced by a new filter element.

In many instances, the air filter elements are constructed to be provided as replacement parts. Thus, recommended servicing for the equipment using an air cleaner involves periodic replacement of the air filter element. The used air filter elements are managed through various waste material discard programs.

Issues of concern with respect to the management of the air filter element design construction include at least the following:

1. Size;
2. Cost and ease of manufacture;
3. Quality of seal between the element and the air cleaner;
4. Quality of seal between end caps of the filter element, and the filter media; and,
5. Ease of installation and removal.

In general, improvements in air filter element design and manufacture are continual issues. Systems which offer improvements with respect to one or more of the above factors, can provide significant advantage.

SUMMARY

According to the present disclosure an improved air filter element is provided. The preferred air filter element includes first and second end caps, with a media pack extending between the end caps. In one preferred embodiment, the media pack is cylindrical, and has an inner liner and no outer liner. A media retaining band may be provided, around the outside of the media pack.

The end caps are preferably provided in a form such that each has no peripheral standoff indents, and no centering fin indents, around its perimeter. Preferably each end cap does include a standoff trough spaced from its outer periphery.

A preferred method of manufacture is provided. The method generally involves standing a media pack on a standoff ring, in a mold; and, molding a preferred end cap which includes an outer peripheral area that is both standoff indent free and centering fin indent free.

BRIEF DESCRIPTION OF THE DRAWINGS

in FIG. 6 portions being shown broken away to indicate internal detail.

Figure 1:
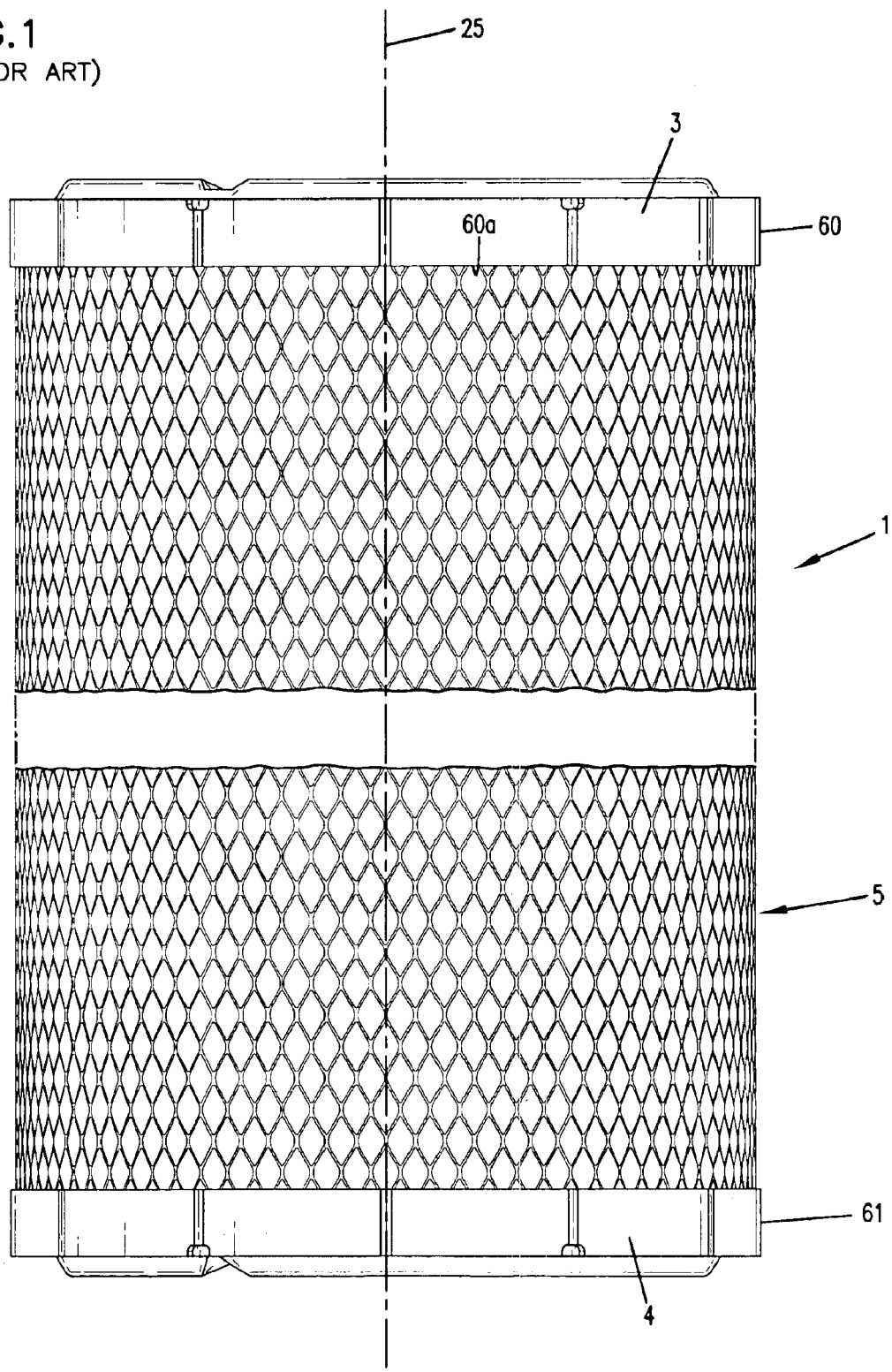
FIG. 1 is a fragmentary, schematic, side elevational view of a prior art filter element.

In some instances in the drawings, relative component sizes and thicknesses may be shown exaggerated, for clarity. Preferred relative dimensions are provided in the following descriptions.

DETAILED DESCRIPTION

I. Air Cleaner Constructions Generally

The techniques described herein can be applied in a wide variety of air cleaner systems. However, they are particularly well adapted for use in association with filter elements for air cleaners that are used for filtering intake air streams to internal combustion engines, for example the engine of a vehicle. This will become apparent from the further detailed descriptions provided hereinbelow, in connection with preferred applications of the techniques. For the reason that it is currently foreseen that a majority of applications of the described technology will be in association with vehicle engine air intake air cleaners, general background presentations relating to typical constructions of such air cleaner systems are provided herein.

In general, although those techniques have wider application, preferred applications and techniques described herein relate to the construction of air cleaner systems which utilize a radial seal. The term "radial seal" in this context generally refers to a seal between a removable filter element and a portion of the air cleaner housing or air flow tube, with the seal forces being generally directed radially with respect to a central axis. In general, in current radial seal systems this is accomplished by either: (a) sealing a seal portion of the filter element around an air flow tube or similar housing portion; or, (b) sealing an outer peripheral surface area of a portion of the filter element to the inside wall of a cylindrical or tubular construction. The techniques described herein will most typically be applied to the former type of radial seal, i.e. a radial seal resulting from a portion of the filter element being sealed around an air flow tube or around a similar portion of a filter element housing. Such radial seal systems will be generally referenced herein as "internal" or "internally directed" radial seals. The second type of radial seal is generally referred to herein as an "external" or "externally directed" radial seal.

Air filter elements which utilize internal radial seals are typically configured in a cylindrical configuration, having an outer perimeter and an internal side defining an open, filter interior. The air cleaners which utilize such systems are generally configured either as "forward flow" or as "reverse flow" arrangements.

For forward flow arrangements, the air cleaner is constructed and arranged such that air flow, during filtering, is directed into the cylindrical filter element from the exterior environment, with the direction of flow being through the media to the open filter interior, and thus the open filter interior comprises the clean air side of the filter element. The air flow then passes through an outlet tube, or outlet construction, to which the element is sealed with the internal radial seal.

In contrast, in a reverse flow air cleaner, the air flow through the filter element is generally from the interior side of the cylinder through the media to the outer side. When such an arrangement is utilized with an internal radial seal, generally the tube to which the element is sealed with the internal radial seal is an inlet air flow tube.

One of the best known and most widely commercialized internal radial seal systems, especially for vehicles and air compressors, is provided in a product line designed and manufactured under the direction of Donaldson Company Inc. of Bloomington, Minn., the assignee of the present application. This product line is generally referred to as the Donaldson RadialseaL™ product line.

Although the Donaldson type radial seal system has been implemented in a variety of forms, in general the Donaldson type of radial seal air cleaner assembly comprises a housing having first and second opposite ends. One end of the housing is closed, except for the projection of an air flow tube or passage therethrough. Depending on whether the air cleaner assembly is a forward or a reverse flow system, the air flow tube or conduit to which the element is sealed is either an outlet tube or an inlet tube. This tube may be a fixed part of the housing, or a separate, snap-in, part.

On a global scale, a substantial majority of the Donaldson-type radial seal systems installed and used, involve forward flow systems. Thus, the air flow tube, to which the element is sealed by the internally directed radial seal, is typically an outlet tube (or part of an outlet conduit). A form of forward flow, Donaldson, radial seal system is generically depicted in EP 0 329 659, incorporated herein by reference. A Donaldson-type reverse flow system is depicted in U.S. Pat. No. 5,938,804, also incorporated herein by reference.

In Donaldson systems, the housing includes an opening, typically in the side wall, for air flow passage. For forward flow systems, the sidewall opening is generally an air flow inlet opening.

Also, in a typical Donaldson radial seal system, especially a typical forward flow system, the housing end opposite the end having the air flow tube passing therethrough, is an openable service or access end, with a removable access cover. That is, in such systems the cover is mounted to be openable, typically by removal, for access to the interior of the assembly; and, the resulting passageway is sufficiently large to allow for servicing of an interiorly received filter element.

Typical servicing of the Donaldson type radial seal air filter element in a radial seal air cleaner, involves the following steps: (a) the air cleaner service cover is opened or removed; (b) the internal radial seal filter element installed within the system is removed (by hand and without tools); (c) a second radial seal filter element is positioned (by hand and without tools) in the air cleaner housing, typically by pushing an opening in an end of the air filter element over and around the outlet tube, to generate a new internal radial seal; and, (d) the service cover is closed or remounted.

In some systems, typically off-road applications, the air cleaner includes secondary or backup filter elements. When the system is one of these, in general there is a safety element which is positioned such that during complete assembly, the Donaldson-type internal radial seal element, which is typically called the primary or main element, is mounted over the secondary or safety element. During typical servicing the safety element may or may not be removed and be replaced (again is replaced typically by hand and without tools). Safety element use, in a Donaldson-type of radial seal system, is shown in WO 99/47287, incorporated herein by reference.

Commercial examples of Donaldson forward flow radial seal systems include the following: Donaldson EPG RadialseaL™ products; Donaldson ERG RadialseaL™ products; Donaldson FPG RadialseaL™ products; and Donaldson FRG RadialseaL™ products. The internal radial seal in each is generally a form or variation of the seals shown in the following publications, incorporated herein by reference: EP 0 329 659; WO 99/42719; WO 99/47237; and WO 99/14483.

In certain other Donaldson systems, a reverse flow is utilized. Examples of internal radial seal, reverse flow, application in commercial products include: Donaldson ERA RadialseaL™ products. The internal radial seals in such systems are generally in accord with the basic principles described in the following publication, incorporated herein by reference, U.S. Pat. No. 5,938,804.

II. A Typical Prior Art Donaldson-Type Air Cleaner

Figure 3:
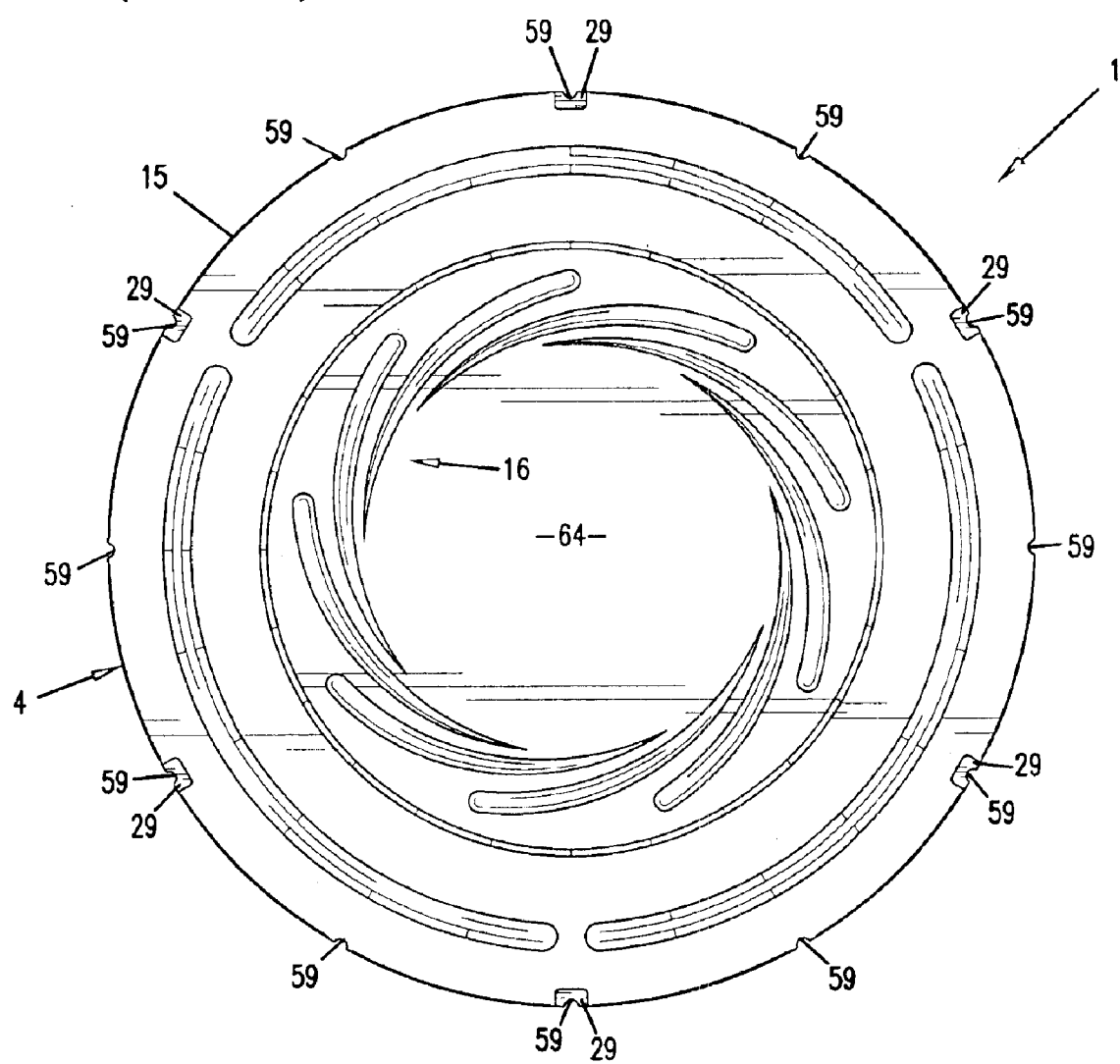
FIG. 3 is a bottom plan view of the filter element shown in FIG. 1.
Figure 4:
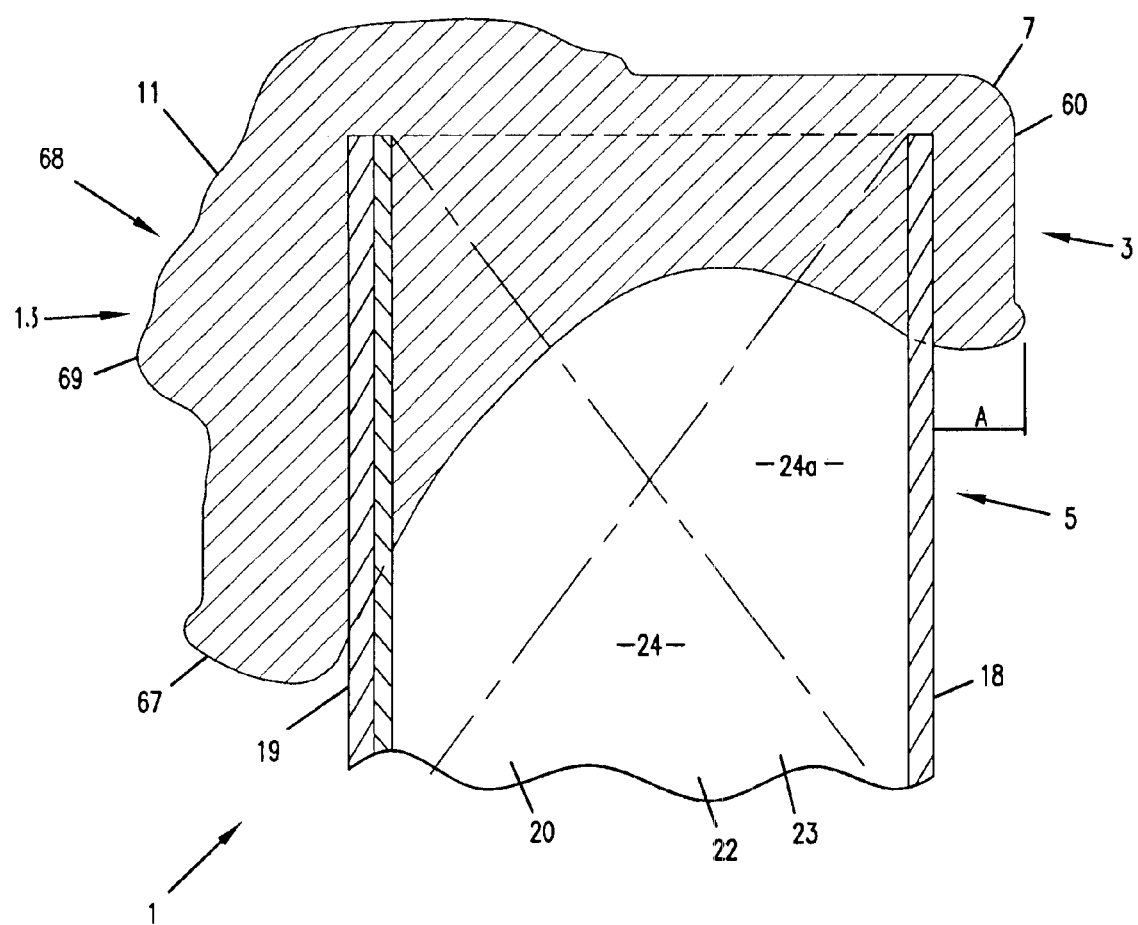
FIG. 4 is an enlarged, fragmentary cross-sectional view of the prior art filter element shown in FIG. 1, taken generally along line 4—4, FIG. 2.
Figure 5:
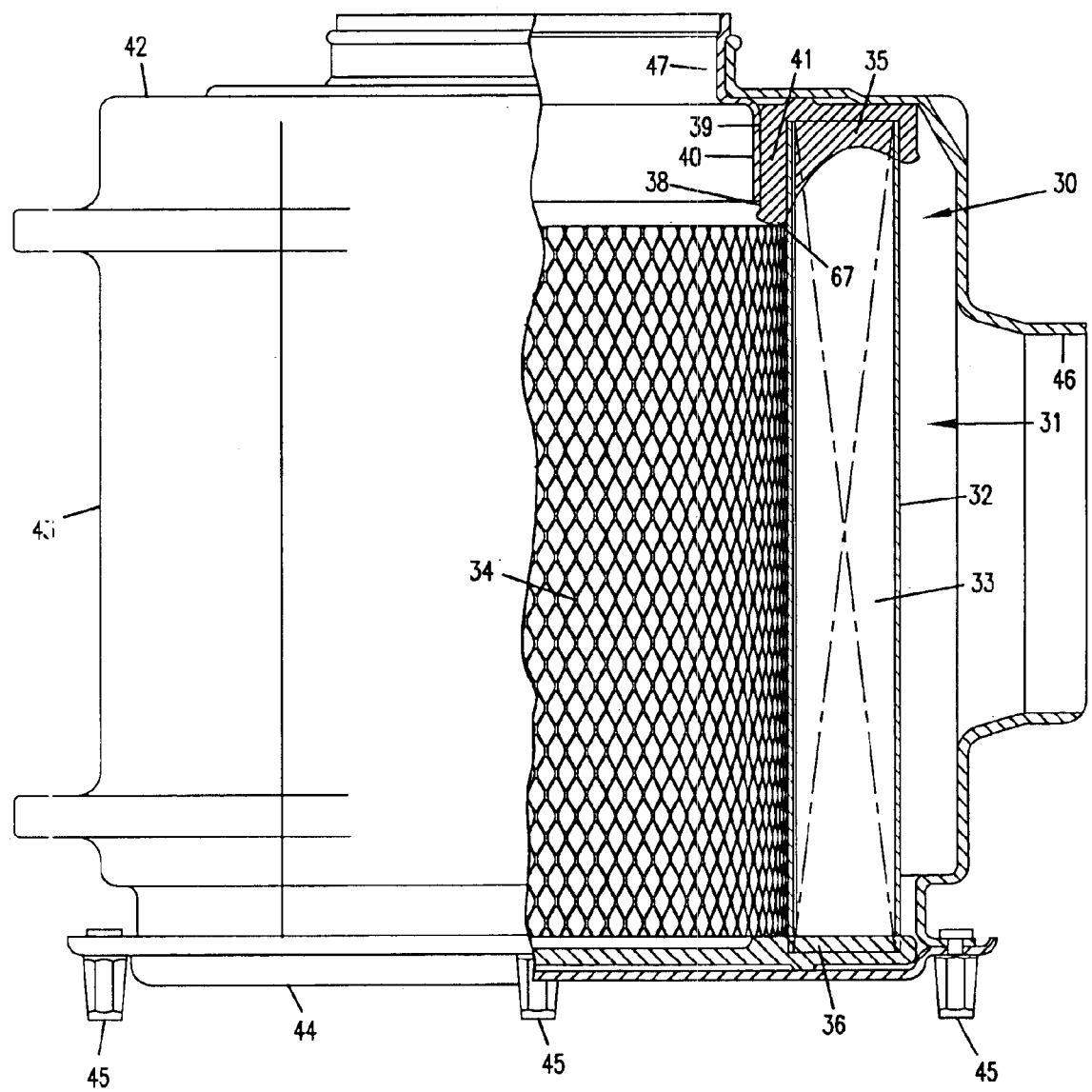
FIG. 5 is a schematic, partially cross-sectional, view showing a prior art element in a filter housing.
Figure 5A:
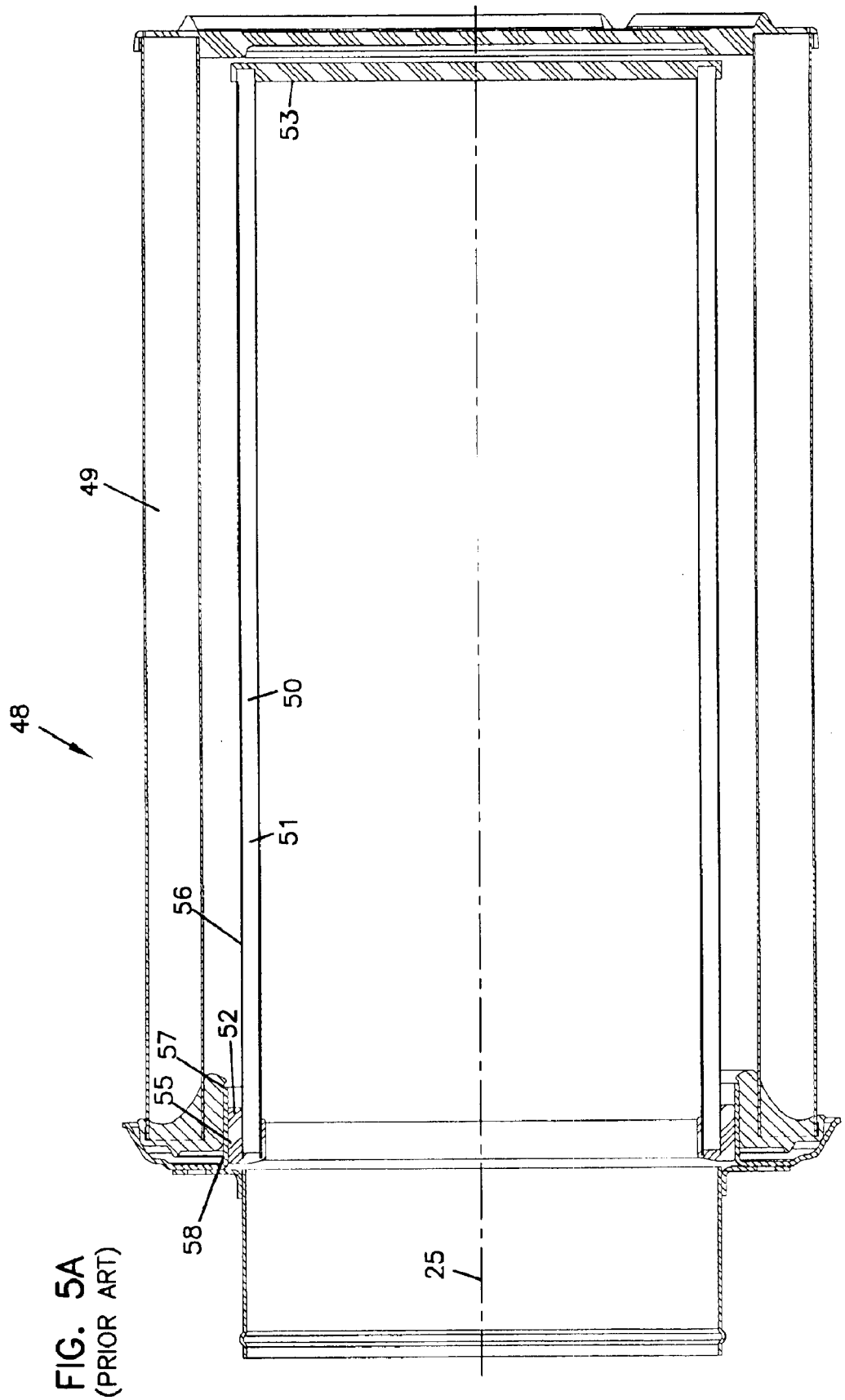
FIG. 5a is a schematic cross-sectional view showing a prior art filter element, and a prior art safety element.

Attention is now directed to FIGS. 1–5 and 5a. In FIGS. 1–4, a typical prior art Donaldson forward flow radial seal filter element is depicted. In FIG. 5, such an element is depicted (schematically) in use. In FIG. 5a, a system including a safety element is shown (again schematically). The particular configuration shown in FIGS. 1–4 would, for example, be used in a Donaldson air cleaner such as a Donaldson FPG air cleaner for a truck or bus. Schematic examples are depicted in WO 99/14483 and U.S. Des. 401,306, each of which is incorporated herein by reference. In U.S. Des. 412,567, a Donaldson-type air cleaner housing, for such an element, is depicted.

Referring to FIG. 1, the radial seal filter element 1 depicted includes: first and second end caps 3 and 4 with media pack 5 extending therebetween. Filter element 1 depicted has a generally cylindrical configuration. Thus, each of the first and second end caps 3, 4 has a circular outer circumferential area or perimeter, FIGS. 2 and 3. In FIG. 1, the element 1 is depicted in broken or fragmentary view. From this it will be apparent that in actual use, the elements will have a variety of diameter to length ratios, depending on the application.

Figure 2:
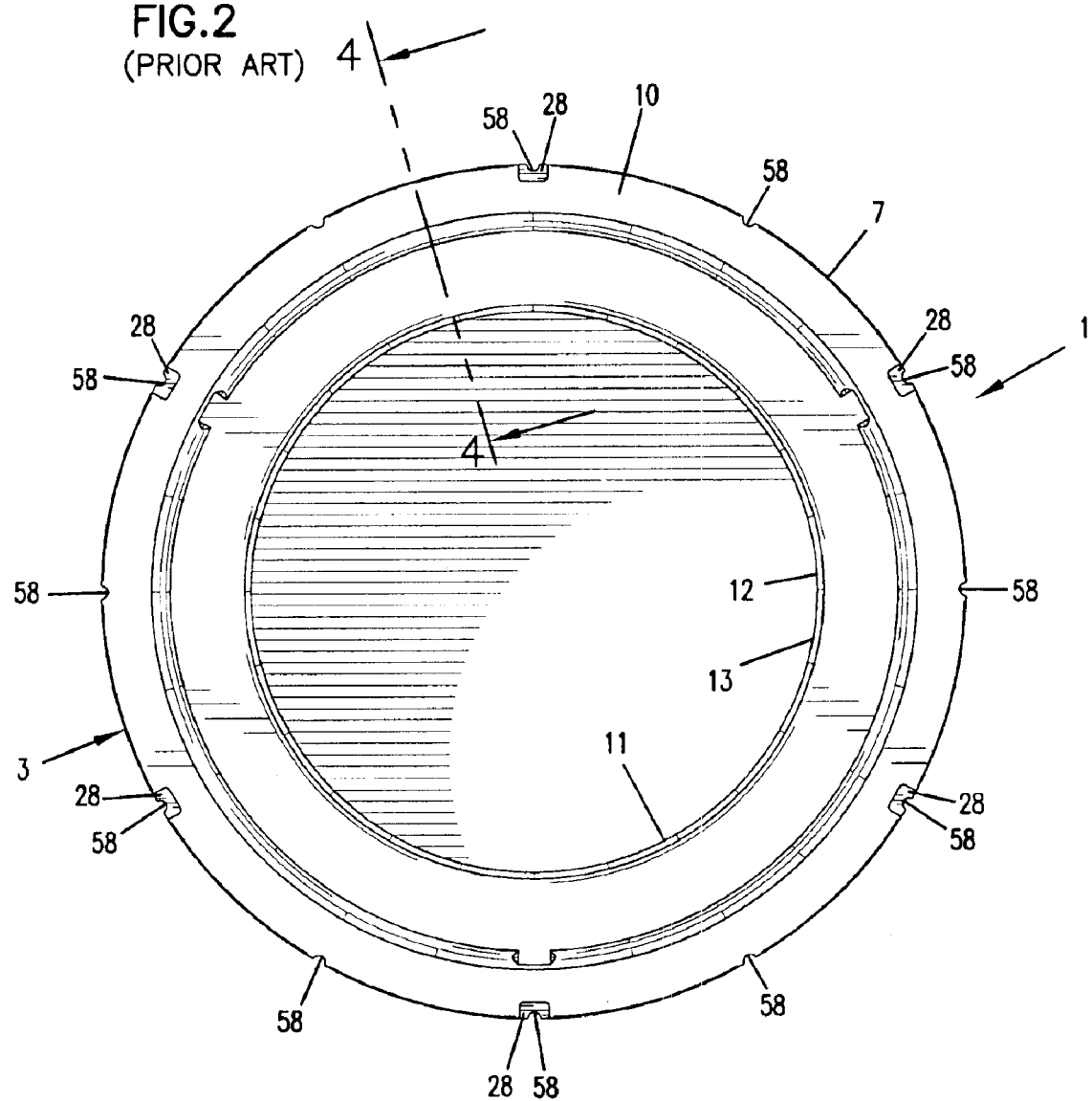
FIG. 2 is a top plan view of the prior art filter element shown in FIG. 1.

Referring to FIG. 2, the first end cap 3 is an end cap which forms the internal radial seal. Thus, it is configured as a ring 10 having outer periphery 7 and a central bore 11. An inside surface portion 12 of the central bore 11 defines a radial seal region 13 which, in use, seals to an outer surface of an air flow tube or similar portion of an air cleaner housing.

Referring to FIG. 3, the second end cap 4 is generally a closed end cap 15 having no central bore or aperture. Thus, the end of filter element 1 defined by end cap 4 is closed to passage of air therethrough. It is noted that in FIG. 3, a distinctive swirl design 16 is shown molded into end cap 4. This design 16 serves as a source identifying feature or trademark, for Donaldson products, and it also provides for an attractive, distinctive, appearance.

Attention is now directed to FIG. 4, which generally represents a fragmentary, cross-sectional view of filter element 1. Referring to FIG. 4, the media pack 5 comprises a porous outer liner 18, a porous inner liner 19 and a media construction 20 positioned in extension between the two liners 18, 19. As of early 2000, the most commonly used media construction 20 for a Donaldson type radial seal air filter element, especially for engine air intake, was a pleated media construction 22, typically comprising a pleated cylinder 23 of dry media 24 having a media length of at least 7.6 cm (3 inches) and typically 15 cm to 74 cm, and pleats at least about 0.9 cm (⅜ inch) typically 0.9 cm to 7.6 cm deep (⅜ inch to 3 inches), with the pleat direction or crease direction of the media 24 extending longitudinally between the end caps 3, 4. (In the figures, the pleats are not depicted, except for one typical pleat 24a, FIG. 4.) In many systems, the pleated dry media would have been provided with pleat spacing, through utilization of such arrangements as pleat tip folds as described in U.S. Pat. No. 4,615,804, incorporated herein by reference. However, in FIG. 4, no effort is made to detail such pleat spacers. Typically, a pleat population of about 10 to 14 on the inside diameter would be used. It will be understood from a review of FIGS. 1 and 4, that a cross section of end cap 4 would appear similar to FIG. 4, except there would be no central bore 11 for generation of a radial seal.

As is apparent from a review of FIGS. 2, 3 and 4, media pack 5 is embedded in each of end caps 3, 4, with the media pack 5 extending therebetween. The process of embedding the media pack 5 in the end caps 3, 4, is generally conducted in a manner which ensures that there will be no significant air leakage around the ends of the media construction 20, at the interface between the media construction 20 and the opposite end caps 3, 4.

A wide variety of commercially successful Donaldson-type radial seal arrangements have been constructed utilizing, as the material from which the end caps 4 and 5 are formed, a moldable, curable, liquid resin of a type useable to form, on cure, a resilient, soft, compressible, foamed material. Reasons for this include: (a) the ability of such material to form a preferred radial seal region 13 which can be readily compressed, i.e. squeezed and thus reduced in dimension, between the inner liner 19 and portion of an air flow tube, to form or establish a desirable, durable, radial seal; and, (b) the ability of such a material to form good, durable, seals at the ends of the media pack 5, to avoid bypass air flow through the end caps 3, 4 by leakage around the filter media construction 20. A preferred material which has been used by Donaldson for the end caps 3, 4 is a liquid resin useable to form, upon cure, a soft, compressible, polyurethane foam end cap.

A typical process for the construction of the filter element 1 depicted in FIGS. 1–4, would be as follows: a media pack 5 is constructed, by positioning a selected media construction 20 between inner and outer liners 18, 19. One end of the resulting cylindrical media pack 5 is then inserted into a mold, with the pack 5 standing upright, the mold having been configured to form a selected one of end caps 3, 4, and in which there has been placed sufficient uncured polyurethane composition to form the end cap. The resulting end cap is then cured, by curing of the polyurethane foam through a free rise process. By "free rise" in this context, it is meant that the polyurethane composition selected, and the mold configuration, allows the urethane to foam and to freely rise, with curing (as opposed to a closed mold process). In general the polyurethane cure process proceeds readily and is exothermic, and thus expensive and time consuming oven operations can be avoided.

After a first one of the end caps is formed using the process defined, the resulting (one end-capped) construction is then demolded and is inverted and stood in a second mold, also containing an uncured polyurethane composition, with curing occurring according to an analogous free rise process.

Attention is next directed to FIG. 5. In FIG. 5, a schematic depiction is shown of a typical prior art Donaldson air cleaner system, utilizing an internally directed radial seal. Referring to FIG. 5, a primary or main filter element is depicted at reference numeral 30. It comprises media pack 31 which includes porous outer liner 32, media 33 and porous inner liner 34. The arrangement has first and second end caps 35, 36. End cap 36 is a closed end cap. End cap 35 has an open central aperture 38 defining radial seal region 39. When element 30 is installed, it is slid or pushed over outlet tube 40, to compress region 41 between inner liner 34 and the tube 40. Typically, the end cap material is chosen so that with hand force and not using tools (typically no more than about 70 lbs of force, preferably 55 lbs or less, more preferably 40 lbs or less, and typically 20–35 lbs) a compression of the material 41, at the location indicated, of preferably at least 1 mm, and/or at least 18% of its uncompressed form, typically at least 1.8 mm and/or at least 25% of its uncompressed form, and often between about 30–37% (inclusive), is readily achieved. Also, the material is preferably chosen so that with hand force and no tools, service personnel can readily separate (dismount) the element 30 from the tube 40.

Still referring to FIG. 5, the air cleaner includes a housing 42 comprising body 43 and removable end cover 44. The end cover 44 can be dismounted by means of bolts 45, for access into the filter element 30. In general, air flows through inlet 46, and through element 30, with clean air existing through outlet 47.

Referring now to FIG. 5a, there is depicted, in fragmentary, cross-section, an air cleaner construction 48 with both a main element 49 and a safety element 50. The safety element 50 would include a media pack 51 extending between end caps 52, 53. The end cap 53 would be a closed end cap. The other end cap 52 would have an open central region. The safety element 50 would include, at the open end cap 52, an outer perimeter area 55. The outer perimeter area 55 would compress between a liner 56 and an inside 57 of outlet tube 58, to form an externally directed radial seal when installed. From review of FIG. 5*a*, it can be seen that primary element 49 can be replaced, without dismounting the safety element 50, if desired. The primary element 49, would typically be as previously described, FIGS. 1–5.

III. Certain Issues and Features Relating Prior Art Techniques of Free Rise Molding of Element End Caps, Using Polyurethane Foam In general, commercial manufacturing techniques relating to the preparation of elements of the type indicated in FIGS. 1–4, have evolved to certain general approaches. First, it is preferred that the ends of the liners 3, 4, as well as the ends of the media construction 20, not "break through" or project through the polyurethane foam, in the resulting product, at least not throughout the entire circumference. This break through, when it occurs, is generally in the "axial" direction. By the term "axial" herein, reference is generally meant in a direction generally parallel to a central longitudinal axis of the cylindrical filter element, for example axis 25, FIGS. 1 and 5*a*.

In part, in order to avoid undesirable levels of such axial "breakthrough", it is important that the filter element not undesirably rest on the bottom of the mold, as the cure proceeds. In general, to facilitate this, the amount of the polyurethane selected, and the configuration of the mold selected, are in part a function of the size, weight and media pleat configuration of the media pack 5, such that as the cure proceeds, the curing polyurethane can flow underneath the bottom portion of the media pack 5 and rise between the pleats, to form a good seal. Also, the media pack 5 is generally configured so that its integrity does not change, during the free rise process. That is, portions of the media pack 5 should not slide, longitudinally or axially, with respect to other portions, during end cap manufacture. To help avoid this relative movement of the media pack components, sometimes, after the media pack 5 is initially assembled, the inner liner 19 is slightly expanded, pressing the media construction 20 against the outer liner 18, to ensure a snug media pack 5 in which the components, 18, 19, 20 do not readily slip, longitudinally (axially), relative to one another.

In addition, to facilitate avoidance of "axial breakthrough" in Donaldson-type radial seal elements, for internally directed radial seals, the molds have generally been configured such that the contact between the filter pack 5 and the bottom of the mold, when the filter pack 5 is first inserted in the mold, only occurs along or near the outer periphery of the filter pack 5, and only occurs in relatively small, spaced, locations. To accomplish this, radially spaced, peripheral, standoffs are provided in the lower surface of mold, around the periphery. The standoffs support the outer liner and outer portions of the media, during end cap formation. The standoffs will result in a corresponding standoff indent or recess in the resulting end cap. Referring to FIG. 2, in end cap 3, there are six of these standoff indents, located at 28, and in FIG. 3, there are six such standoff indents, for end cap 4, located at 29. (Smaller sized end caps, for example about 16 cm in diameter, typically use three such indents.) In general, the indents 28 are typically evenly (radially) spaced. From a review of FIGS. 2 and 3, it will be apparent that during manufacture, the media pack 5 was stood in a mold with the outer liner 18 resting on spaced standoffs. As the free rise polyurethane cure occurred, the liquid, curing, polyurethane resin would have flowed around the standoffs, providing for end caps without an undesirable level of breakthrough, but with standoff indents 28, 29. Such standoff indents are typically about 3 mm deep and have a size (in top plan) of about 4–5 mm by about 6 mm.

Also, in general, during the molding process it is important to maintain the media pack 5 round, and to ensure that the media pack 5 is centered in the mold and is positioned such that the element does not become pushed up against one side of the mold. In order to help provide this, the mold is typically provided with centering fins spaced around an outer perimeter of the mold cavity and which engage the media pack outer liner. Analogously to the standoffs, the spacing fins leave "spacing fin indents", in the resulting molded end cap. For the end cap 3 depicted in FIG. 2, there are 12 such spacing fin indents, indicated generally at 58; and, referring to FIG. 3, for end cap 4 there are 12 such spacing fin indents indicated generally at 59. Typically, the spacing fin indents are evenly (radially) spaced.

In general, for a conventional commercial Donaldson-type radial seal filter element, such a mold process involves relatively high use of polyurethane in certain mold regions in part to ensure proper urethane flow around standoffs and fins, and into mold portions, during free rise cure. Such regions are discussed in the following portions of this section.

A. Excess Perimeter Polyurethane

Managing the flow around the standoffs, and spacing fins, during cure, generally results in a specifically defined outer peripheral region of polyurethane. The outer peripheral regions of polyurethane are generally depicted in FIG. 1 at 60, 61. In FIG. 4, this region 60 in end cap 3 is more readily viewable. In general for a filter element having an outer diameter of at least 16 cm, this outer peripheral region would have a thickness of direction, projecting radially beyond the outer liner 18, i.e. in the direction of dimension A, FIG. 4, of at least about 1 millimeter, typically 1 to 3 millimeters. In general, such a region results from the fact that the mold needed to be defined with a cavity in this region, to allow for reliable polyurethane resin flow to engulf the standoffs during manufacture. Also, generally the mold cavity in this region was formed to allow an open free rise area above the standoffs, and circumferencially entirely around the filter element, to allow for the resin to rise in this region. As a result of the free rise, an uneven end 60*a*, FIG. 1, results.

In this context "projects radially" by some amount could be considered to refer to a dimension that would be about one-half of the difference between the outer diameter of the end cap 3 and the outer diameter of the outer liner 18.

It is noted that in a typical system such as that shown in FIGS. 1–4, the element possesses an outer liner 18 which itself generally has a thickness of at least 0.5 mm (0.02 inch); typically about 0.7 mm (0.028 inch). As a result of the liner 18, and stated in terms of the outermost surface or point of extension of the media, the outer peripheral regions 60, 61 each extend a distance of, typically, within the range of about 1.7 mm to 3.7 mm beyond the media 23. (In this definition, the outer liner 18 is not considered part of the media 23.)

B. Excess Polyurethane Thickness (Axial) in the Closed End Cap

In general, it was also found with the above described processing approach, which requires adequate polyurethane flow to the outer peripheral region to cause the molded region 60 at the open end cap 3, and the analogous region 61 at the closed end cap 4, leads to an additional region of excess polyurethane use in the closed end cap 4. In particular, central region 64, FIG. 3, is generally thicker, and bulges more inwardly into the media pack 5, FIG. 1, than is necessary to merely ensure that region 64 is covered. Again, a reason for this is that the depth of polyurethane in the mold at this location, during manufacture, needs to be adequately deep to ensure that flow of polyurethane around the outer peripheral area is adequate for coverage of the mold stand-offs and for good flow of urethane between media pleats, during polyurethane rise and cure. In a typical element having an outside diameter of at least 16 cm, in the center 64 of the closed end cap 4, the urethane would be at least 6 mm thick, typically more than 9 mm thick.

C. Excess Polyurethane Rise in the Area of the Radial Seal Region 13

Attention is directed to FIG. 4. It is noted that in FIG. 4, "below" radial seal region 13, there is located region 67 of cured polyurethane. In general, region 67 does not significantly participate in the radial sealing, and does not form a seal against any portion of an air flow tube or housing, during use. Rather, region 67 results from excess polyurethane use and resin free rise in a central portion of the mold from which end cap 3 is constructed, in the regional of the radial seal. Again, in part this excess use of polyurethane results from the need to have sufficient excess polyurethane to ensure that the outer peripheral standoffs are engulfed during the rise cure. Another reason for this excess polyurethane use is to ensure a complete and proper rise and flow into the mold profile that forms the stepped radial seal portion 68. Yet another reason for excess use concerns the depth to which the stepped radial seal region 68 projects into the interior of the element 1.

A general characterization of region 67 would be that it extends inwardly of the element 1, in a direction away from the smallest internal diameter portion 69 of the radial seal region 13, by distance of at least 3 mm, often more than 5 mm beyond the deepest point of penetration of an outlet tube 40, FIG. 5, during use.

IV. A Preferred New Radial Seal Element Construction

Figure 6:
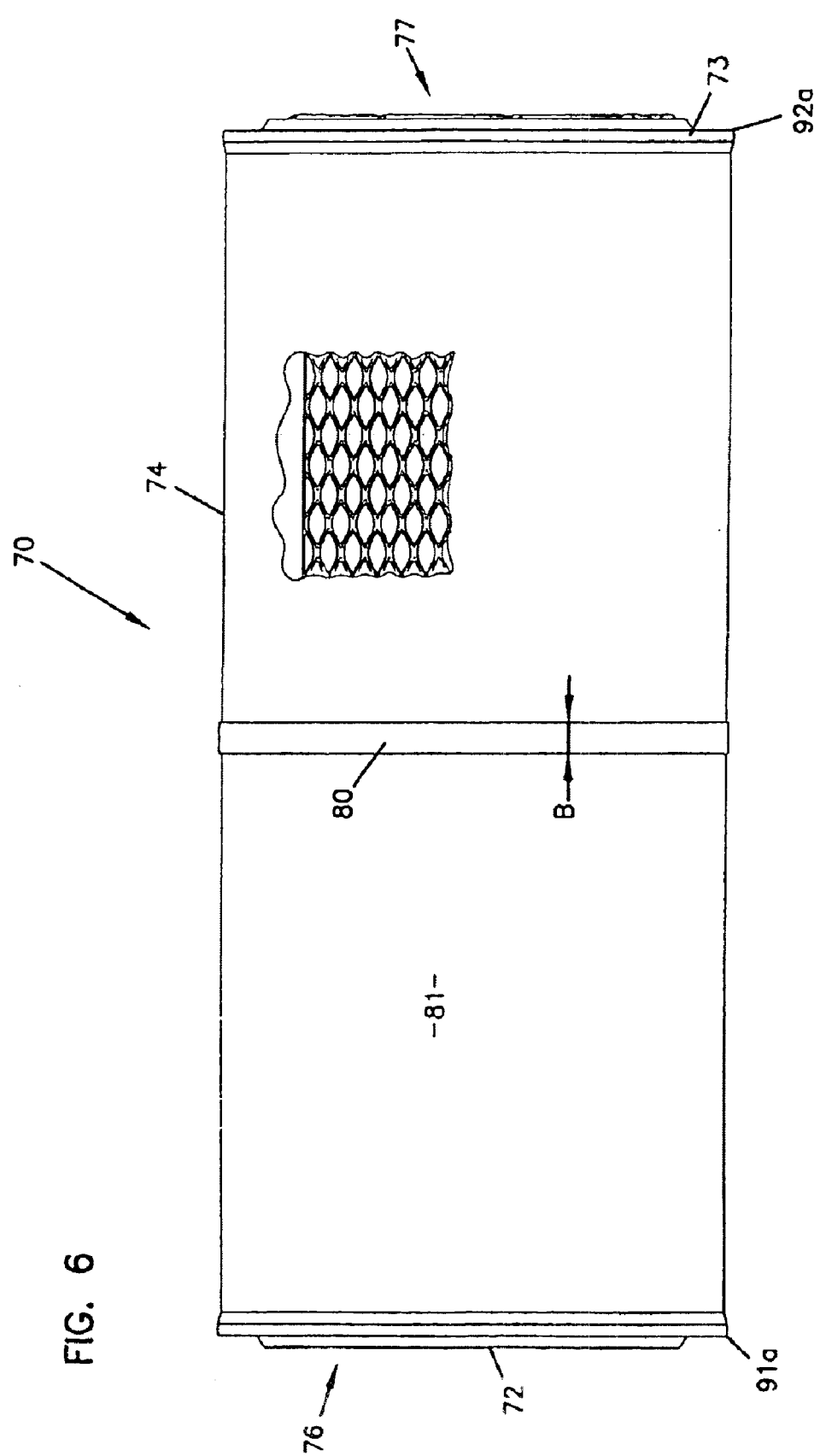
FIG. 6 is a schematic side elevational view of a filter element according to the present invention.

An improved radial seal element 70 is depicted in FIGS. 6–11. Referring first to FIG. 6, the element 70 includes first and second end caps 72, 73 with media pack 74 extending therebetween. As will be apparent from further discussions below, first end cap 72 comprises an "open" end cap 76, and is constructed and arranged to form an internal radial seal with a flow tube or similar construction in a housing. For certain preferred embodiments, second end cap 73 is a closed end cap 77, i.e. it has no central flow apertures therein. It is noted, however, that the techniques described herein could be utilized to prepare a filter element that has two open end caps, for example with each capable of forming a radial seal with an air cleaner component.

As is apparent from a review of FIG. 6, for the particular preferred improved element depicted, element 70, there is no outer liner, i.e. it has an "outer-liner free" media pack. Indeed, except for a narrow retaining band 80, around the outer periphery of the media pack 74, the media 81 is directly exposed to the outer peripheral environment. By "directly exposed" in this context, it is meant that there is no outer liner or covering, perforated or otherwise, between the media 81 and the external environment other than: at the ends of the media 81 the end caps 72, 73; and, centrally, the retaining band 80. The function of the retaining band 80 will be discussed further below. The band 80 may comprise a common box strapping.

Preferably the retaining band 80 is relatively narrow. Typically it will have a width, i.e. axial dimension indicated at B, FIG. 6, of no more than 15 millimeters, and typically, within the range of 5 to 11 millimeters. Also preferably, the retaining band 80 is positioned centrally in the media pack 74, typically spaced at least 5 cm away from contact with each one of end caps 72, 73. The band thickness will typically be about 0.3 mm–0.8 mm.

Figure 9:
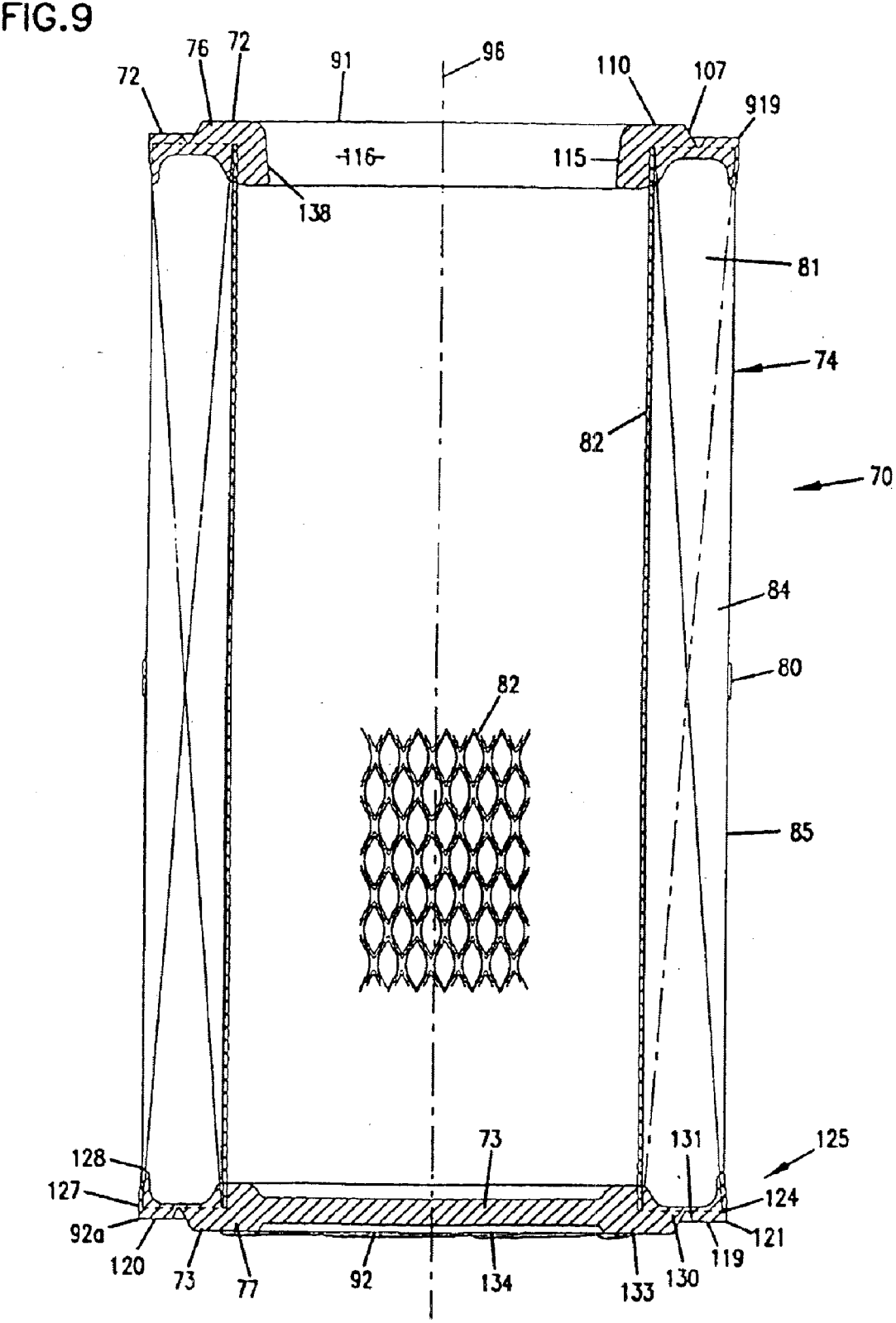
FIG. 9 is a schematic cross-sectional view of the filter element shown in FIG. 6, taken generally along line 9—9, FIG. 7.

Attention is now directed to FIG. 9, which is a cross sectional view of the element 70. From FIG. 9, it is apparent that the media pack 74, of the preferred embodiment depicted, comprises, from inside to outside, porous inner liner 82, media 81 and retaining band 80. For the particular embodiment shown, the media 81 comprises pleated media 84, with pleats extending axially, i.e. in the direction from end cap 76 to end cap 77. Preferably, the pleat depth is within the same range as that identified for the embodiment of FIGS. 1–4, i.e. 0.9–7.6 cm. The particular, preferred, pleated media 84 depicted comprises a pleated corrugated media, with the corrugations 86, FIG. 11, extending generally perpendicularly to the longitudinal or axial extension of the pleats 85; thus the corrugations 86 can be characterized as extending radially relative to axis 96, FIG. 9. Use of corrugated media for the pleated media is conventional, see U.S. Pat. No. 4,616,804, with the corrugations 86 helping to prevent pleat collapse. In FIGS. 6–10, for convenience, the filter media is depicted schematically, and the pleats and corrugations are not depicted. Indeed, such is intended to indicate that pleated media, corrugated or otherwise, is not necessarily required, in certain embodiments.

Figure 11:
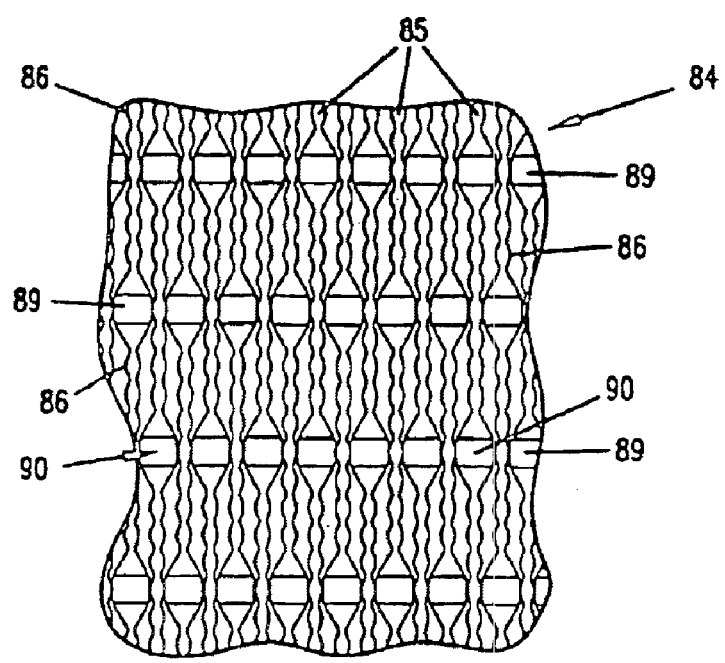
FIG. 11 is an enlarged, schematic, fragmentary view of media pleats of the element depicted in FIG. 6.

In FIG. 11, a schematic depiction, fragmentary, of pleated media 84 is shown. The view of FIG. 11 could be considered a detailed, fragmentary, portion of the side elevation of FIG. 6. Referring to FIG. 11, the corrugations are indicated schematically at 86, generally directed toward and away from the viewer, with the pleats depicted at 85, shown extending vertically in the drawing.

The particular pleated media 84 depicted also utilizes spaced folds or pressed portions 89, FIG. 6, along the inner and outer edges of the pleats 85. These are conventional pleat spacers 90, sometimes referred to by the mark "PleatLoc", often utilized in cylindrical pleated constructions. Techniques for forming pleat spacers 90 are described, for example, in U.S. Pat. Nos. 4,452,614; 5,066,400; and, 4,615,804, incorporated herein by reference. It is noted that for preferred applications, the axial dimension of each spacer 90 may extend further than from one trough to another, on opposite sides of a single corrugation. In general, spacers with an axial dimension extending over 1–3 corrugations may be useful.

Attention is now directed to the first end cap 72, depicted in FIGS. 6, 7, 9 and 10. Certain distinguishing features of end cap 72, will be understood by comparison to the corresponding end cap 3 in filter element 1, FIGS. 1–4.

In general, filter element end caps herein will be referenced as having an outer or "axial" surface. The term "axial" when used in this manner, refers to the surface of the end cap which faces away from the remainder of the element. For end cap 72, FIG. 7, the axial surface is surface 91. For end cap 73, FIG. 8, the axial surface is surface 92. The term "axial surface" will in some instances be utilized in the context of characterizing a particular portion of an end cap feature.

In general, and referring especially to FIGS. 6 and 9, the outer edges 91a, 92a of an end cap will generally be referred to as "circumferencial" edges, as the "perimeter" or by similar terms. For a typical end cap, the perimeter of each end cap will be generally circular.

Figure 7:
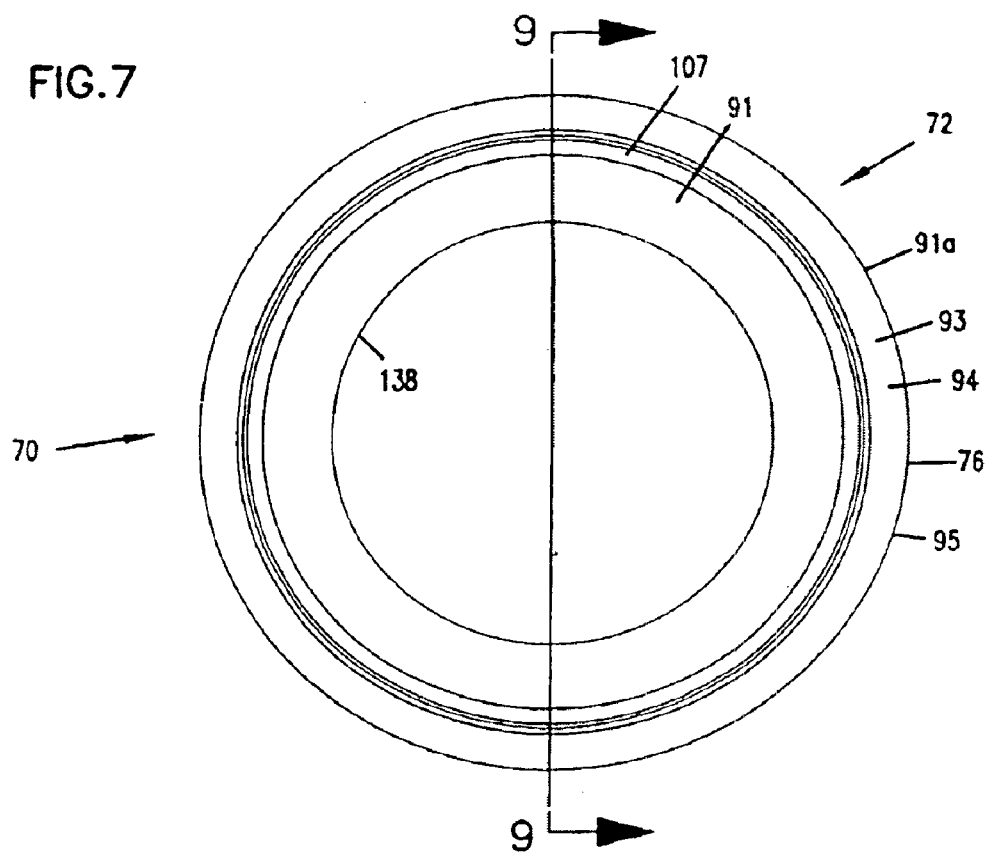
FIG. 7 is a top plan view of the filter element shown in FIG. 6.
Figure 8:
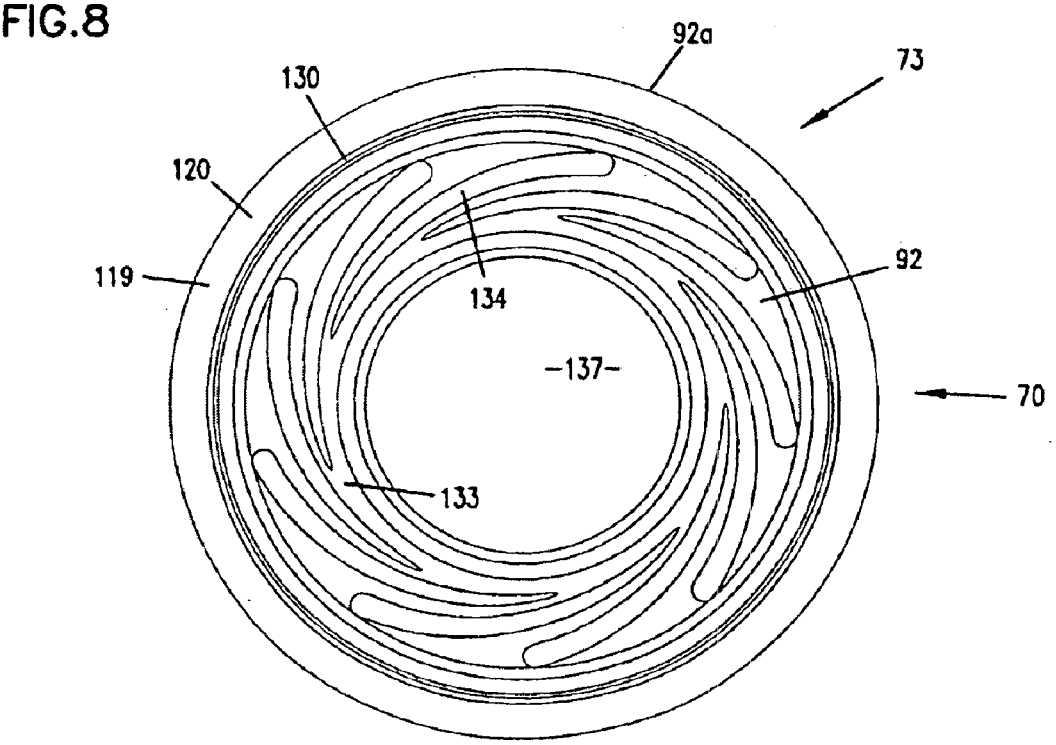
FIG. 8 is a bottom plan view of the filter element shown in FIG. 6.

Referring to FIG. 7, end cap 72 includes no outer peripheral standoff indents, analogous to indents 28, 29, FIGS. 2 and 3. That is, perimeter 91a has no standoff indents in it. Indeed, still referring to FIG. 7, which is a top view of open end cap 76, one can see that the open end cap 76 has an outer peripheral ring portion 93, which has a smooth axial surface 94 and an outer circular edge 95, defining a perimeter that has no indents, depressions or similar constructions that would result from outer peripheral standoffs in the mold. Herein the term "outer peripheral standoff indent free" or similar terms will be used to characterize such a construction. That is, the term, and variants thereof, refers to a filter element end cap which does not, along its outer periphery or perimeter, have spaced indents or depressions that are the result of mold standoffs.

In general, the term "standoff indent free" is meant to refer to the absence of recesses in the outer perimeter resulting from structure on which the media pack was rested, or set, during molding. Shallow recesses or similar structure in the outer peripheral area of the end cap would not necessarily be "standoff indents", since if they were not adequately deep, they would not have resulted from a point on which the media pack would actually have rested during the manufacture. This will be apparent from review of the discussion below in connection with the method of manufacture. Thus, the term "standoff indent free" is not meant to be synonymous with smooth. The surface could have some irregularities in it, including purposely molded features, while at the same time being "standoff indent free". In general, a depression will not be a "standoff indent" unless it extends sufficiently deeply through the end cap, to essentially encounter the media pack. It is noted that surface 94; for the particular embodiment shown in FIG. 7, is both standoff indent free and smooth.

Still referring to FIGS. 6 and 7, it is noted that the preferred end cap 72 also does not include any spacer fin indents, analogous to spacer fin indents 58, 59, FIGS. 2 and 3, that would have resulted had the mold included spacer fins therein. Herein the term "outer peripheral spacer fin indent free" or similar terms, will be used to characterize such a construction. That is, the term, and variants thereof, refers to a filter element end cap which does not, along its outer periphery or perimeter, have spaced indents, recesses or depressions that are the result of mold centering fins or spacing fins.

Figure 10:
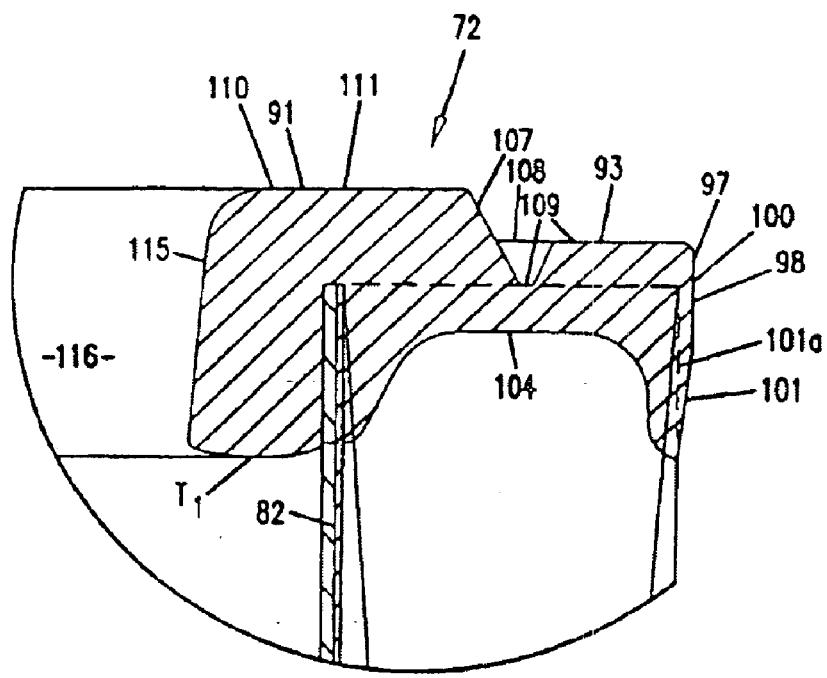
FIG. 10 is an enlarged fragmentary partially schematic view of a portion of the filter element shown in FIG. 10.

In general, analogously to the discussion above about standoff indents, not all indents that may appear in the outer margin of the end cap are necessarily spacer indents. To qualify as a spacer indent, the indent would have to be adequately deep so that the fin structure in the mold was encountered by the media pack, when it was placed in the mold during the molding operation to leave the spaced fin indents. It is noted, that the outer perimeter area of end cap 72 is smooth, as well as "spacer fin indent free."Attention is now directed to features of end cap 72 depicted in FIGS. 6, 9 and 10; FIG. 10 being an enlarged view of a portion of FIG. 9. In particular, attention is directed to FIG. 10 and to outer annular portion 97 of end cap 72. By "outer annular" in this context, attention is directed to a portion of the end cap 72 which has a face 98 directed in a radial direction outwardly. More generally, the term "annular" when used herein, is meant to refer to a portion of the element 70 which either faces generally towards central axis 96, FIG. 9 or which faces generally away from central axis 96. When the portion faces away from central axis 96, and is positioned on the outer cylindrical surface of the element 70, the portion will be characterized as an "outer annular" portion, or by a similar term. It is noted that the outer annular portion of end cap 72 is both standoff indent free and spacer fin indent free.

In particular, referring to FIG. 10, the outer face 98 of outer annular portion 97 includes two regions: an end or edge region 100 and a next inner region 101. In general, end region 100 is the region located adjacent the axial end of the element 70 and adjacent curved corner or edge 102. That is, it is region 100 of end cap 72 which generally, with outer peripheral ring 93, forms the outer corner or edge 102 of the end cap 72, and defines perimeter 91a, FIGS. 7 and 9. The next inner region 101 is located axially toward the second end cap 73, FIG. 9, from the first end region 100.

Preferably, the first region 100 is both "standoff indent free" and "centering fin indent free". Preferably it is smooth and has an outer diameter which projects outwardly from an adjacent portion of the media pack 74, no more than 2 millimeters, typically 1.5 millimeters or less, more preferably no more than 1.2 mm, most preferably no more than 0.8 mm. Alternately stated, preferably the outside diameter of the end cap is no more than 4 mm larger than the outside diameter of the immediately adjacent portion of the media pack; preferably no more than 3 mm larger, more preferably no more than 2.4 mm larger, most preferably no more than 1.6 mm larger. Preferably region 100 extends over an axial distance, i.e. distance from outer ring 93 toward second end cap 73, at least 4 millimeters, typically not more than 15 millimeters, in many typical elements having outside diameters of about 8 cm to 40 cm, an axial distance of about 4 to 9 millimeters. Preferably, when the element outside diameter is 25 cm or less, the axial distance of extension of region 100 is within the range of 4 to 9 mm.

In still another alternate characterization, preferably the amount of projection of the end cap radially outwardly from the adjacent portion of media pack is, on average, no more than 2 mm, typically 1.5 mm or less, more preferably no more than 1.2 mm, most preferably no more than 0.8 mm. In this context "on average" means when measured at total of at least 6 different, equally spaced locations around the perimeter, and averaged.

In the previous two paragraphs the term "adjacent portion of the media pack" was used to allow the band 80, which is spaced from the end cap, to be disregarded in the measurement.

From a review of FIG. 10, it will be apparent that since the element 70 includes no outer liner, first end region 100 can alternatively be characterized with respect to projection from the media 81 itself, for example, as projecting outwardly from the adjacent media 81, i.e. the media pleat tips 103 if pleated media 81 is used, by no more than 2 millimeters, typically 1.5 millimeters or less, preferably no more than 1.2 millimeters. Indeed, most preferably the projection is 0.8 mm or less. This means that there is relatively little polyurethane use, and thus waste, in this region of the end cap 72.

The next inner region 101 is preferably beveled, or chamfered radially inwardly, from a point or ring of contact with end region 100. Typically, in that portion peripheral to the media 81, region 101 will extend over an axial distance of at least 4 mm and not more than 10 mm by the time it abuts the media 81. Preferably the angle of bevel, at 101a, FIG. 10, is no more than 10° and is within the range of about 5° to 9°, typically about 6°–7°. By the term "beveled, radially inwardly" in this context, it is meant that surface 101 is angled relative to surface 100 such that in movement toward the second end cap 73, the surface angles toward central axis 93 or pleat tips 103. The bevel 101a could alternately be stated as the acute angle of declination toward axis 93 or the pleat tips 103. In general, the bevel 101a results from a mold structure that helps direct polyurethane flow, during cure, between media pleats 85, to cause good sealing between the end cap 72 and the media 81. Most preferably the bevel 101a proceeds continuously into contact with the media 81.

In particular, if one considers the configuration of a mold that would be utilized to create the configuration of regions 100 and 101, it is apparent that the mold configuration would bevel inwardly toward the pleats 85, and preferably just into contact with the pleats 85, above a portion of the mold that forms end region 100. As the liquid resin would "rise" during cure, in this region, the resin would tend to be forced to flow toward, and in-between, the media pleats 85, rather than upwardly around the media (or pleat tip) perimeter. This will be explained in greater detail below, in connection with a characterization of the molding process. It should be apparent, however, from reviewing FIG. 10, that to accommodate the configuration of regions 100, 101, the region of mold that forms the beveled or chamfered portion 101, would need to taper either into contact with the media 81, or nearly to contact with the media 81, typically an angle of slightly under 180°, preferably 171° to 175°, relative to a mold surface that forms region 100.

Attention is directed to line 104, which schematically represents the depth of penetration of the resin in-between the pleats 85, during the cure. It is noted that this will tend to be an uneven line in actual products, with a depth of axial penetration varying depending on the precise location and amount of urethane rise. It can be observed that in general, there may even be some places of higher rise or deeper penetration between the pleats 85, than in region 101 exterior to the pleats 85, due to the fact that resin will have been directed by the bevel 101a and the mold, as discussed below, back into the region between the pleats 85.

Referring now to FIGS. 7, 9 and 10, the first end cap 72 includes a standoff ring indent or trough 107 therein. The standoff ring indent 107 is preferably located in the axial surface 91 of the end cap 72. The standoff ring 107 is a trough or depression 108 preferably spaced (on center at the bottom 109 of the trough) at least 4 millimeters, typically within the range of 5 to 12 millimeters, preferably about 6–10 mm inwardly from the outer circular edge 95 or 102 of end cap 72. In general, annular peripheral ring 93 circumscribes standoff ring 107, and comprises the portion of the end cap 72 between the standoff ring 107 and the outer circular edge 95 or 102, or perimeter 91a.

Standoff ring 107 is preferably circular, and comprises a depression at least about 1 mm and typically no greater than 3 mm deep, preferably, typically about 2 mm at its deepest projection, when measured from an outer axial surface 109 of outer peripheral ring 93.

Standoff ring 107 is a recess which results from a mold ridge or standoff on which the element media pack rests during the initial stages of formation of end cap 72. The process which generates standoff ring 107 will be described in detail below.

Still referring to FIGS. 6, 7 and 9, end cap 72 includes a surface region 110 having outer or axial face portion 111. Region 110 generally extends inwardly, from standoff ring 107 across axial face 91 of end cap 72, toward radial seal region 115 and axis 96, FIG. 9.

For the preferred embodiment shown, in region 110 the axial thickness of end cap 72 is generally greater, than is the axial thickness in region portion 93. This is readily understood by review of the cross sections, FIGS. 9 and 10. Generally the thickness of region 110, measured to the media 81, FIG. 10, for elements having an outer diameter of at least 8 cm, typically 8 cm to 40 cm, is at least 3 millimeters, generally not more than 14 millimeters, most typically about 4 to 11 millimeters; i.e. about 5 mm. Typically, the thickness of region 110 will be larger than the thickness of region 93 by 2 to 4 millimeters. When the element diameter is 25 cm or less, typically the axial thickness of region 110, to the media 81, will be 4 to 6 mm.

Referring to FIGS. 9 and 10, end cap 72 includes radial seal region 115 directed radially (or annularly inwardly), along an interior of the end cap 72 to form interior radially directed surface 116. Region 115 between surface 116 and the inner liner 82 generally operates to form a radial seal between the element 70 and an air cleaner, in use, by compressing the material in region 115 against the outer surface of an air flow tube or analogous portion of an air cleaner housing.

The specific configuration of radial seal region 115 and surface 116 may be varied, depending on preference. However, for the particular preferred embodiment shown, surface 116 is generally smooth, meaning that it does not have depressions, steps, bumps or ribs therein. Surface 116 generally extends (as it goes deeper into the element) at an angle of less than 1°, typically about 0.5°, inwardly relative to axis 96. Preferably region 115 does not vary in thickness (from liner 82) by more than about 20% over its axial distance of at least about 4 mm., typically at least 6 to 14 millimeters. In general, it will be preferred that the axial length of region 115 from surface 110 inwardly be longer than the thickness of the material in this region, in order to inhibit folding of the material instead of compression, during radial sealing.

From the above, it will be apparent that the specific configuration of the particular, preferred, embodiment depicted, of radial seal region 115 and surface 116, differs significantly from the analogous region 68 in the embodiment shown in FIGS. 14. The surface 116 which is pressed against a flow tube, to form the actual radial seal, in use, for the embodiment of FIGS. 5–8, does not have a stepped construction, defining regions of different internal diameter. There is no sealing bump or lip protruding toward the central axis 96, or the flow tube in use. Rather, the surface 116 is generally smooth over an axial extension of at least 4 mm, and preferably over its entire axial extension.

In addition, the region 116 does not vary that greatly in thickness, i.e. in distance from the inner liner 82, by more than 20% in that portion which is backed up by the liner 82. This is defined in a previous paragraph as referencing a lack of difference in thickness over an axial direction of the surface 115, of at least 4 millimeters and typically over a distance of at least 6 to 14 millimeters. It is recognized that there will be some differences in thickness resulting, for example, from the slight taper identified above.

Preferably, the thickness dimension at $T_1$ FIG. 10, in this radial seal region 115, between the liner 82 and the outer surface 116 is at least 4 mm, typically within the range of 5 to 12 millimeters for elements having a size of at least about 16 cm. Also preferably, when radial seal use occurs, the compression within the region is such that the thickness dimension is reduced by at least 18 percent, typically 29 to 38 percent, or alternatively stated by a distance of at least 2 millimeters, typically 3 to 5 millimeters. Typically, the element 72 is sealed to a circular construction having an outer diameter of at least 3 mm larger than the smallest inside diameter of region 115.

Region 115 can be characterized by the absence of a region analogous to region 67 for the element depicted in FIG. 4. That is, preferably end cap 72 includes no portion that projects inwardly of the element, from the smallest diameter portion that engages an outlet flow tube, during installation; i.e. preferably no portion of end cap 72 in region 115 goes axially further into the element than does the outlet tube, in use.

It is noted that certain of the advantages of the present disclosure can be obtained even when alternate cross-sectional shapes for the radial seal region are used. Thus, for example, the radial seal region could be molded with a configuration similar to region 68, FIG. 4. Still further variations, to achieve different sealing effects, are possible.

Attention is now directed to the second end cap 73. For the particular embodiment shown, the second end cap 73 is a closed end cap. Its features are viewable in FIGS. 6, 8 and 9. Referring to FIG., 9, second end cap 73 includes, analogously to end cap 72, a smooth, standoff indent free and centering fin indent free outer peripheral ring 119 having an outer axial surface 120 and an outer circular edge or perimeter 121; and, a smooth, standoff indent free and centering fin indent free, outer annular portion 124. Also, the outer annular portion 124 includes face 125 defining an end region 127 and an extended region 128 extending at a chamfer or bevel angle, relative to the end region 127, of less than 10°, typically about 5° to 9°. Again, preferably the bevel 101a extends continuously to the media 81, or at least nearly to the media 81.

Also analogously to end cap 72, end cap 73 includes a standoff ring 130 defined by trough or depression 131. The standoff ring preferably has a depth, relative to axial surface 120, of ring 119, of at least 1 mm and preferably not more than 3 mm.

Indeed, it is anticipated then in the preferred embodiments, many features of the two end caps 72, 73 could be molded from identically specified portions of molds. Thus, the dimension of many of the other identified portions of end cap 73 would preferably be the same as those characterized above for end cap 72.

It is also noted that end cap 73 includes an end surface region 133 analogous to region 110. For the particular embodiment shown that region includes distinctive markings 134 thereon, which serve to enhance the appearance of element 70, and which also can serve a source identifying function.

Finally, unlike end cap 72, end cap 73 includes central region 137, comprising a closure over the end of the media pack 74. This region 137 is positioned in the same region where end cap 72 contains open aperture 138. Preferably at its thickest point, region 137 is no more than 8 mm thick, more preferably no more than 6 mm thick.

V. Preferred Applications

It is foreseen that the preferred configurations characterized in the previous section will be particularly appropriate for use with vehicle filters having: an outside diameter of at least 15 cm; an axial length of at least 25 cm; an overall weight of at least 300 grams; and with a bore or aperture in the first end cap having an internal diameter of at least 8 cm, typically at least 9 cm. It is foreseen that the techniques can be readily applied to the manufacture of significantly larger elements.

A particular system for which such elements could be used, would be in an engine air intake air cleaner for a vehicle such as an automobile, a pickup truck or a sport utility vehicle, for example a General Motors CK truck.

Typical such systems are configured to provide, at the rated air flow for the engine, a media face velocity of about 10–50 fpm, typically 12–40 fpm, and an cylindrical surface velocity within the range of about 100–500 fpm, typically 200–430 fpm. When a system is configured for high performance, i.e. high flow for high horse power, but relatively low filter life time, it would be sized for a media face velocity within the range of about 50–250 fpm, typically, 100–228 fpm, and a cylindrical surface velocity within the range of about 500–1,000 fpm, typically 650–910 fpm.

Herein the term "media face velocity" refers to the rated engine flow divided by the total upstream surface area of the pleated media. Herein the term "cylindrical surface velocity" refers to the rated engine air flow divided by the cylindrical area defined by the upstream surface of the media. Thus, the "cylindrical surface velocity" refers to the rated engine air flow divided by the product of the cylindrical length of the exposed media times the outside diameter defined by the exposed media. The media face velocity and the cylindrical surface velocity will be the same value, if the media upstream surface is not pleated. However, with the media upstream surface is pleated, it should be apparent that the media face velocity will be substantially lower than the cylindrical surface velocity.

Preferably with such arrangements, the polyurethane formulation chosen provides for a high foam, very soft, molded end cap. In general, the principal issue is to utilize a formulation that provides for an end cap that is such that a robust seal will result under conditions which will allow for hand assembly and disassembly. This generally means that the seal range which has material is a relatively low density, and exhibits appropriate and desirable compression load deflection and compression set.

Preferably the formula chosen will be such as to provide end caps having an as molded density of no greater than 28 lbs./cubic foot, more preferably no more than 22 lbs./cubic foot, typically no greater than 18 lbs/cubic feet and preferably within the range of 13 to 17 lbs/cubic foot.

Herein the term "as molded density" is meant to refer to its normal definition of weight divided by volume. A water displacement test or similar test can be utilized to determine volume of a sample of the molded foam. It is not necessary when applying the volume test, to pursue water absorption into the pores of the porous material, and to displace the air the pores represent. Thus, the water volume displacement test used, to determine sample volume, would be an immediate displacement, without waiting for a long period to displace air within the material pores. Alternately stated, only the volume represented by the outer perimeter of the sample need be used for the as molded density calculation.

In general, compression load deflection is a physical characteristic that indicates firmness, i.e. resistance to compression. In general, it is measured in terms of the amount of pressure required to deflect a given sample of 25% of its thickness. Compression load deflection tests can be conducted in accord with ASTM 3574, incorporated herein by reference. In general, compression load deflection may be evaluated in connection with aged samples. A typical technique is to measure the compression load deflection on samples that have been fully cured for 72 hours at 75° F. or forced cured at 190° F. for 5 hours.

Preferred materials will be ones which when molded, show a compression load deflection, in accord with ASTM 3574, on a sample measured after heat aging at 158° F. for seven days, on average, of 14 psi or less, typically within the range of 6–14 psi, and preferably within the range of 7–10 psi.

Compression set is an evaluation of the extent to which a sample of the material (that is subjected to compression of the defined type and under defined conditions), returns to its previous thickness or height when the compression forces are removed. Conditions for evaluating compression set on urethane materials are also provided in ASTM 3574.

Typical desirable materials will be ones which, upon cure, provide a material that has a compression set of no more than about 18%, and typically about 8–13%, when measured on a sample compressed to 50% of its height and held at that compression at a temperature of 180° F. for 22 hours.

In general, the compression load deflection and compression set characteristics can be measured on sample plugs prepared from the same resin as used to form the end cap, or on sample cut from the end cap. Typically, industrial processing methods will involve regularly making test sample plugs made from the resin material, rather than direct testing on portions cut from molded end caps.

Urethane resin systems useable to provide materials having physical properties within the as molded density, compression set and compression load deflection definition as provided above, can be readily obtained from a variety of polyurethane resin formulators, including such suppliers as BASF Corp., Wyandotte Mich., 48192.

In general, with any given industrial process to select the appropriate physical characteristics with respect to the material, the key issue will be management of the desired characteristics and the final product, with respect to mounting and dismounting of the element, as well as maintenance of the seal over a variety of conditions. The physical characteristics provided above are useable, but are not specifically limiting with respect to products that may be considered viable. In addition, various element manufacturers, depending on the circumstances, may desire still further specifications, for example, cold temperature compression deflection, typically measured on the sample cooled to −40° F., with the specification being for the pressure required to cause the compression under the ASTM test, for example, being 100 psi max.

One example usable material includes the following polyurethane, processed to an end product having an "as molded" density of 14–22 pounds per cubic foot. The polyurethane comprises a material made with I36070R resin and I3050U isocyanate, which are sold exclusively to the assignee Donaldson by BASF Corporation, Wyandotte, Mich. 48192.

The materials would typically be mixed in a mix ratio of 100 parts I36070R resin to 45.5 parts I3050U isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70–95° F. The mold temperatures should be 115–135° F.

The resin material I36070R has the following description:
(a) Average molecular weight
 1) Base polyether polyol=500–15,000
 2) Diols=0–10,000
 3) Triols=500–15,000
(b) Average functionality
 1) total system=1.5–3.2
(c) Hydroxyl number
 1) total systems=100–300
(d) Catalysts
 1) amine=Air Products 0.1–3.0 PPH
(e) Surfactants
 1) total system=0.1–2.0 PPH
(f) Water
 1) total system=0.2–0.5%
(g) Pigments/dyes
 1) total system=1–5% carbon black
(h) Blowing agent
 1) water.

The I3050U isocyanate description is as follows:
(a) NCO content—22.4–23.4 wt %
(b) Viscosity, cps at 25° C.=600–800
(c) Density=1.21 g/cm$^3$ at 25° C.
(d) Initial boiling pt.—190° C. at 5 mm Hg
(e) Vapor pressure=0.0002 Hg at 25° C.
(f) Appearance—colorless liquid
(g) Flash point (Densky-Martins closed cup)=200° C.

Preferably the material chosen for the inner liner is a relatively rigid expanded metal liner. An open area (porosity) of at least 60%, typically 70–75%, is preferred. Preferably 0.028 inch (or 0.7 mm) thick expanded metal is used. This provides for a good rigid support to the media, and also good rigid backup in the radial seal region, to ensure good radial seal. Alternately, a porous plastic liner could be used, especially for units to be managed, after use, by incineration.

Preferably the material selected for the narrow outer band 80 is a commodity plastic.

The material selected for the media may be varied, depending on the anticipated environment of use and availability of various pleatable substrates. Conventional media available from such suppliers as Hollingsworth and Vose of East Walpole, Mass. can be utilized. It is anticipated that in typical arrangements, pleats 85 in the order of ⅜ inch to 3 inches (0.9 cm to 7.6 cm) in depth, with a pleat population, around the inner diameter, of about 10 to 14 being used.

It is anticipated that elements according to the general descriptions herein will also be useful in the air cleaner systems of off-road vehicles such as: backhoes; loaders; lawn and turf care tractors and equipment; small farm tractors; and skid steer loaders. Also, it is expected that they would also be useful in air cleaner systems of stationary generator sets. Typical applications of these types would involve air cleaners with an outside diameter of about 4 inches–10 inches (10–26 cm); such air cleaners would involve elements with outside diameters of about 3.5–7.5 inches (9–19 cm). They would be designated, for example, for up to 275 cfm air flow, for an 8 inch diameter air cleaner; and up to 550 cfm for a 10 inch diameter air cleaner.

The polyurethane formulation chosen could be the same as that characterized above. Similar materials for the inner liner and the narrow outer band, could also be used.

It is anticipated that for off-road vehicles and generator sets such as those characterized above, pleats 85 on the order of 0.6 to 1.5 in. depth (2–4 cm), with a pleat population around the inner diameter of about 10 to 14, would be used. Typically, for such arrangements, the aperture diameter for the open end cap will be about 1.5–4 inches (3.8–10 cm), the element would be about 7 inches to 16 inches (17.8–40.6 cm) long, and the outside diameter of the end caps would be about 3.5 inches to 7.5 inches (9–19 cm).

In certain off-road applications utilizing an air cleaner with an outside diameter of 18 inches (46 cm), the element would have an outside diameter of up to and including 14.5 in. (37 cm); a pleat depth of up to and including 3 in. (8 cm); an element length of up to and including 20 in. (51 cm); and an air flow of up to and including 1700 cfm.

VI. Process of Manufacture

In general, preferred elements having features analogous to those characterized above for the element depicted in FIGS. 6–10, can be constructed by preferred manufacturing approaches. In this section, preferred approaches are characterized.

In general, the media pack is prepared by conducting the following:

1. Preparing an appropriate cylindrical inner liner.
2. Preparing an appropriate cylindrical extension of media, preferably pleated media, and positioning it around the inner liner to form a liner/media combination.
3. Providing the retaining band around the outside of the liner/media combination to retain the pleated media tightly against the liner, forming a media pack to be used in follow-up construction steps.

The pleated extension may be constructed using a variety of conventional pleating techniques. As indicated previously, a standard corrugated media, pleated in a direction perpendicular to the extension of corrugations, and using pleat spacing techniques, will be a preferred media. In general the process is well adapted to use a variety of alternative media constructions.

The retaining band may comprise a variety of materials. A commodity plastic boxing or binding material can be used. In the alternative, a rubber band or similar construction could be used.

After the element is fully constructed, the retaining band can be removed. However, this would require an additional manufacturing step and can be avoided to economic advantage, if desired, by simply allowing the band to remain on the final product.

The media pack is next stood, in sequential molding steps, in partially filled molds, for generation of the end caps 72, 73. For purposes of this description, it will be assumed that the first end cap formed is the closed end cap 73.

Figure 12:
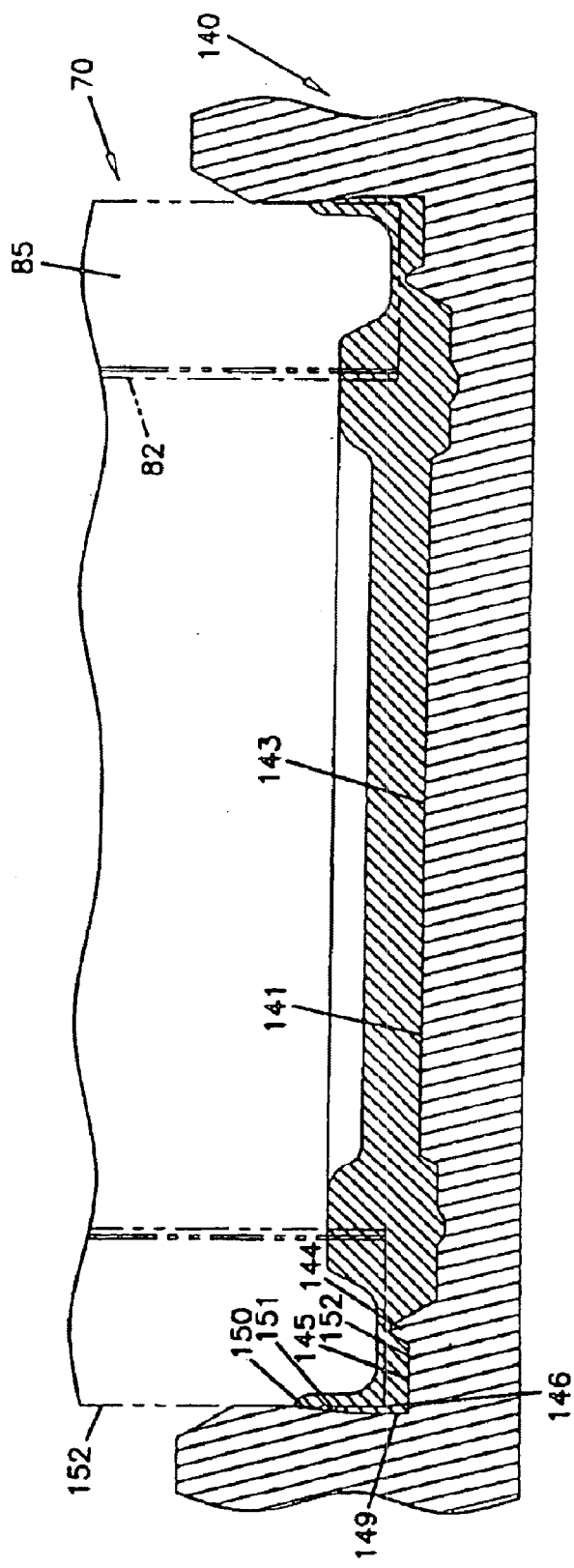
FIG. 12 is a schematic, cross-sectional, fragmentary view of a mold and a filter element (shown in phantom) during molding of a portion of the element depicted in FIG. 6.

The mold used to form the preferred, closed end cap 73 would have an inner mold surface configuration generally analogous to that shown for the end cap 73 in FIGS. 9 and 10. Attention is directed to FIG. 12.

Referring to FIG. 12, the mold 140 includes an inner feature defining surface 141. The surface includes central region 143, standoff ridge 144; outer peripheral ring 145; and outer annular wall section 146.

In general, outer annular wall section 146 includes a higher diameter corner region 149, and a beveled or lower diameter region 150.

In general, annular wall section 146 and outer peripheral ring 145 serve to define a trough 152 which contains fluid polyurethane resin prior to cure, and in which the outer peripheral ring of end cap 73 is formed.

It is first noted that the trough 152 includes no media standoffs and no centering fins therein, along an outer periphery 146 thereof. Rather, the only media standoff provided in mold 140 is ridge 144. Ridge 144 is spaced, on center, inwardly from outer or annular wall section 146 by at least 4 millimeters, typically 5 to 12 millimeters.

An advantage to the construction of the mold 140 characterized in FIG. 12, is that trough 152 can be carefully configured to achieve advantageous flow and use of polyurethane resin along the outer peripheral area of the end cap formation, with precision and control, thus allowing for avoidance of excess use of polyurethane in this region, especially since in this region there is no outer peripheral standoff which must be covered during polyurethane rise and cure.

In the process, the media pack (depicted in phantom) is set in the mold 140, resting upon standoff ridge 144, after an appropriate amount of polyurethane has been dispensed into the mold. During polyurethane rise and cure, the configuration of trough 152 directs a certain portion of polyurethane rise and flow over ridge 144 and between the pleats 85 in the region of ridge 144, to ensure a good sealing end cap. It is noted that because of the bevel or chamfer formed in the mold at 150, free rise which occurs in region 151 generally results in rising resin, during the foam cure, being pinched off from completely free rise outside of the media pleat tips 103, but rather the flow is directed into the space between the pleats 85. Thus preferably, the mold is configured such that in the beveled region 150, the mold forms a neck or throat, and the relative mold and media pack dimensions are such that the mold preferably touches the pleats (or is spaced from the pleats by no more than about 0.5 mm). Preferably, the throat is 1 mm to 4 mm smaller, preferably at least 2 mm smaller) in diameter at its narrowest portion, than bottom region 146 of the mold 140.

It could be anticipated that once the molding process is completed, because in region 146 the molded end cap would have a larger outer dimension than would the mold at region 150, demolding would be a problem. However, it is found that when the preferred dimensions for the mold indicated herein below are chosen, and the polyurethane resin and media pack materials are as indicated as preferred, demolding is not a problem. That is, it can typically be readily done, by hand, without undesirable damage or destruction to either one of the mold or the end cap; and, without using a mold that is sectioned at some location across its diameter. That is, a mold having a single piece, unitary, outer periphery can be used. This in part results from the fact that the cured end cap has a relatively low "as molded density," and thus can compress the form to allow for ready demolding. Also, the absence of an outer liner facilitates the demolding.

In general, the preferred method of dispensing polyurethane resin, immediately prior to cure, into the mold is by dispensing the polyurethane resin into a central region 143 of the mold and spinning the mold to ensure even flow of the polyurethane resin fluid over the mold and into trough 152. Because of the size and position of trough 152 relative to other portions of the mold, it can be ensured that excess polyurethane is not provided in trough 152. That is, excess resin would simply spill over trough 152 and drain into central region 143.

Figure 13:
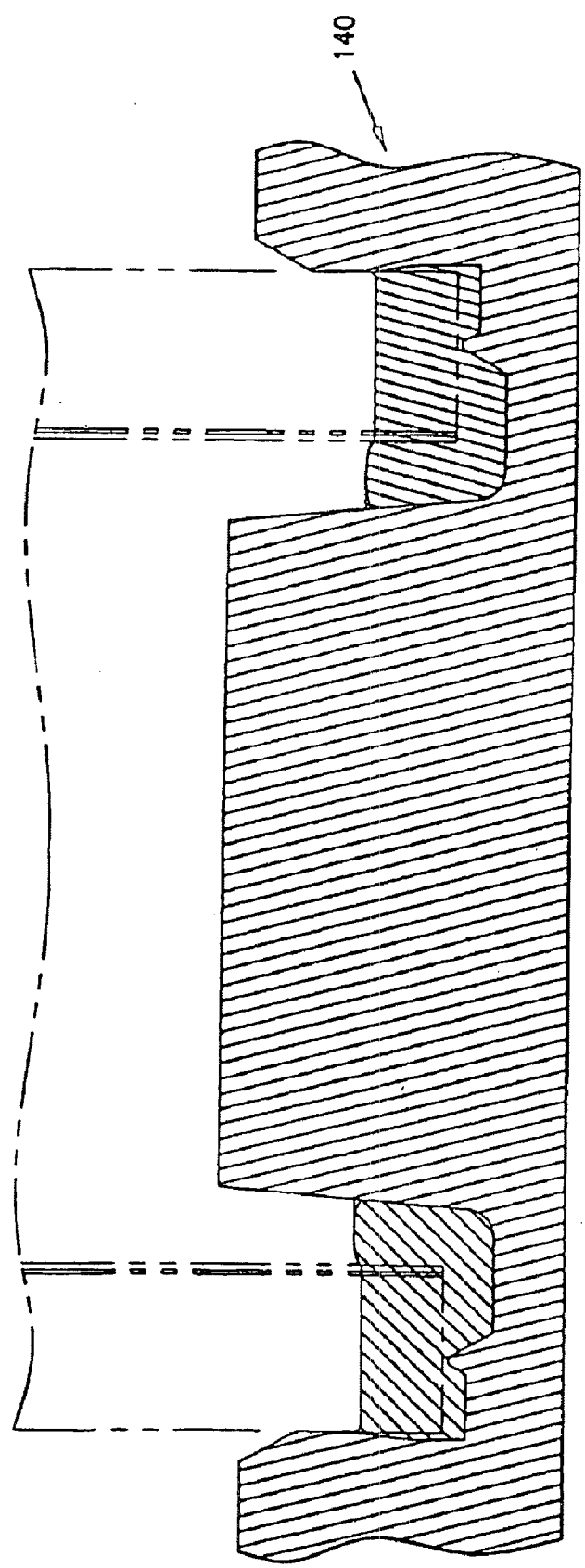
FIG. 13 is a cross-sectional view analogous to FIG. 12, but taken of a mold modified for the construction of a different portion of the filter element shown in FIG. 6.
Figure 10:
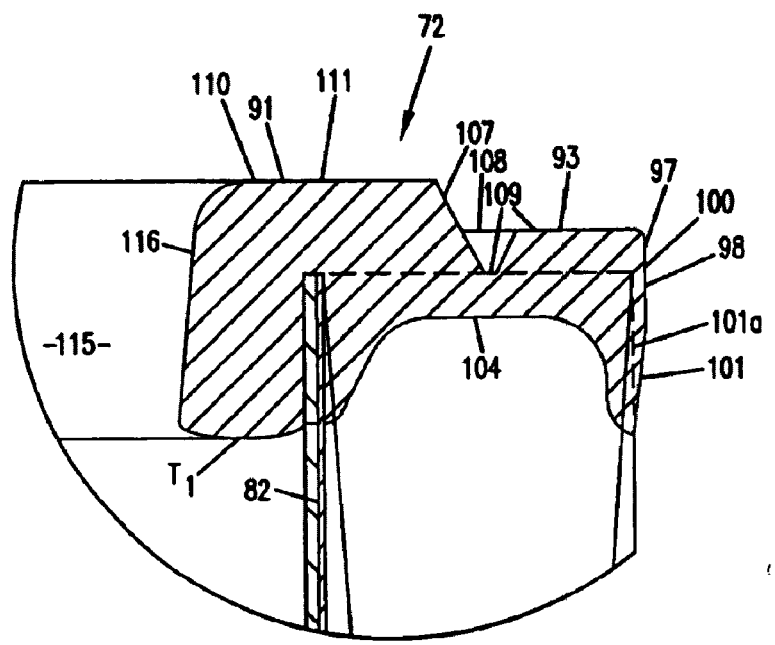
Figure 12:
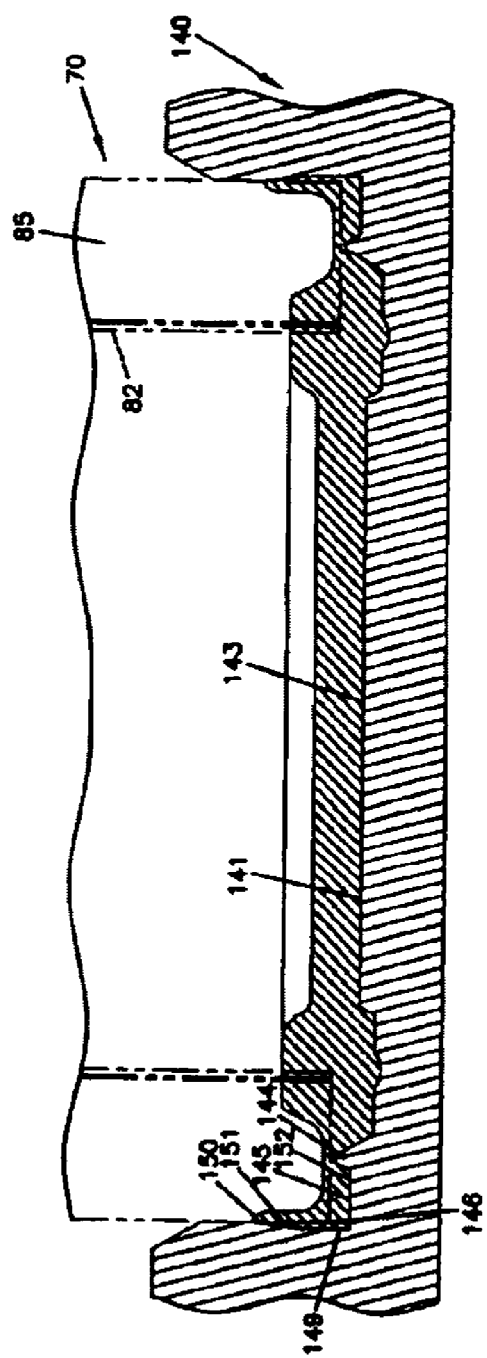

An analogous process can be utilized to form end cap 72, with the mold modified to include a central region or plug that will ensure definition of the radial seal region 115. An example of such a mold is depicted in FIG. 13 at 160.

While the process can be conducted with a variety of materials and in a variety of manners, it is particularly well adapted for certain types of processing. In particular, it would be preferred to use polyurethane compositions which provide an as molded density as characterized above. This provides for a very soft highly compressible end cap. Again, such polyurethane compositions can be readily obtained with two component systems, formulated to provide desired results, from such polyurethane formulator/suppliers as BASF, Wyandotte, Mich., 48192.

In general, the process allows for the avoidance of large expensive oven systems, since polyurethane cure is generally exothermic and is initiated by mixing the two components of the polyurethane system together.

VII. Some Selected Variations.

It was indicated above that in some instances it may be desirable to provide a filter element having two end caps which are open and form radial seals. Such arrangements could be utilized, for example, with both end caps being sealed to outlet tube constructions of similar constructions. Alternatively, one could be sealed to another part of the air cleaner, rather than an air flow tube. It should be apparent that such constructions can be readily made still utilizing the advantageous features to the present invention relating to the overall element configuration, end cap configuration features and preferred molding processes as characterized.

It is foreseen that in some applications the element could be constructed without an inner liner. Although it may not be as desirable with respect to the radial seal features, it may be utilizable where such preferred radial features are not required. An example of how such an arrangement might be constructed, would be to provide the media pack with beads of polymer along the pleat tips 103 which will form and define the open interior of the element. The media pack can then be rolled into the cylindrical construction, sealed to retain the cylindrical construction, and then be provided in the molding process, without liners, to generate the element. Analogously to previous described processing, it may be desirable to provide an outer band on such constructions.

In still other variations, the inner liner may be provided, but not in full or complete extension between the two opposite end caps. Again, this may not be as desirable with respect to preferred radial seal features, but can be readily used with respect to the preferred techniques for generating end cap configurations characterized herein.

The above specification, provides a description of the manufacture and use of the composition of the invention. However, many alternate embodiments of the invention can be made without departing from the spirit and scope of the invention.

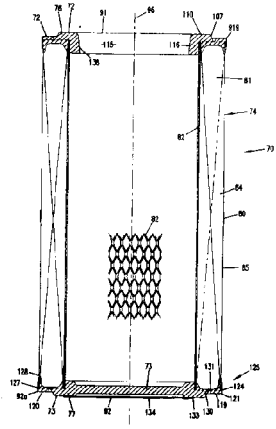

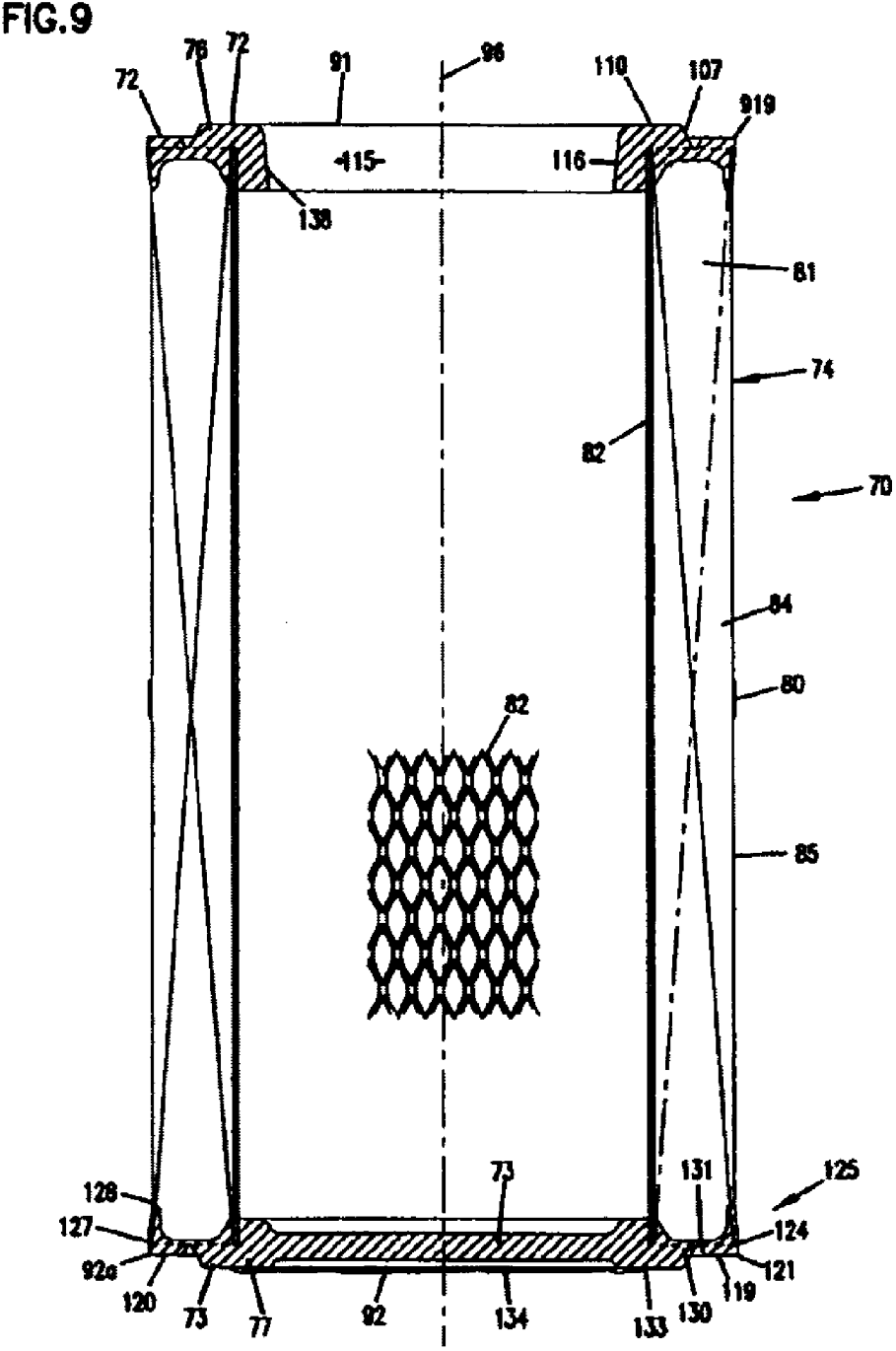

What is claimed is:

1. An air filter element comprising:
   (a) a first end cap;
      (i) said first end cap comprising molded, compressible, resilient foam material; and, said end cap having an as molded density of no greater than 28 lbs/cu. ft.; and,
      (ii) said first end cap having a standoff indent free outer periphery; and;
   (b) a media pack extending into said first end cap;
      (i) said media pack being cylindrical and defining an open filter interior; and
      (ii) said media pack having a cylindrical region of media circumscribing an open interior; and, no outer media liner;
      (iii) said media pack being pleated and having outer pleat edges;
   (c) an outer periphery of said first end cap projecting, radially, outward from said media pack by a maximum distance of projection of no more than 1.5 mm;
   (d) a second end cap comprising molded, compressible, resilient foam material, said end cap having an as molded density of no greater than 28 lbs/cu. ft., the media pack, at an end opposite the first end cap, extending into the second end cap; and
   (e) said first end cap having an outer, annular, surface with a beveled section toward said outer pleat edges extending at a bevel angle of no more than 10° relative to said outer pleat edges.

2. An air filter element according to claim 1 wherein:
   (a) the second end cap comprises an outer periphery projecting, radially, outward from said media pack by a maximum distance of projection of no more than 1.5 mm.

3. An air filter element according to claim 2 wherein:
   (a) said outer periphery of said first end cap projects, radially, outward from said media pack by a maximum distance of projection of no more than 1.2 mm; and,
   (b) said outer periphery of said second end cap projects, radially, outward from said media pack by a maximum distance of projection of no more than 1.2 mm.

4. An air filter element according to claim 3 including:
   (a) an inner liner.

5. An air filter element according to claim 4 wherein:
   (a) said inner liner is embedded in, and extends between, said first and second end caps.

6. An air filter element according to claim 1 wherein:
   (a) said first end cap includes:
      (i) a central bore extending therethrough and opening into said open filter interior; and,
      (ii) a circular standoff trough circumscribing said central bore and spaced from an outer circumference of said first end cap by a distance of at least 4 mm, to define a first end cap outer peripheral ring portion therebetween.

7. An air filter element according to claim 6 wherein:
   (a) said circular standoff trough in said first end cap has a depth, from an axial surface of said first end cap outer peripheral ring portion, within the range of 1 mm to 3 mm.

8. An air filter element according to claim 6 wherein:
   (a) said first end cap includes a radial seal region positioned to circumscribe and define said central bore;
      (i) said radial seal region having an internal, radial seal, surface oriented to engage an air flow tube during use; said internal, radial seal surface having a smooth radial seal surface portion, devoid of steps, bumps and ridges, which extends over a distance of axial extension of at least 4 mm.

9. An air filter element according to claim 6 wherein:
   (a) said second end cap has a central region, enclosing an end of said media pack open filler interior, having a maximum thickness of 8 mm.

10. An air filter element according to claim 6 wherein:
    (a) said second end cap includes a circular standoff tough spaced from an outer circumference of said second end cap by a distance of at least 4 mm, to define a second end cap peripheral ring portion therebetween.

11. An air filter element according to claim 1 including:
    (a) an outer retaining band, circumscribing said region of media, and having an axial width of no greater than 15 mm.

12. An air filter element according to claim 1 wherein:
    (a) said media pack comprises pleated media having a pleat depth of at least 0.9 cm.

13. A method of preparing a filter element; said method comprising steps of:
    (a) standing a media pack in a first mold having uncured polyurethane foam resin therein;
       (i) the first mold having an outer region which is standoff free; and
       (ii) the first mold having a standoff ring spaced, on center, at least 4 mm from an annular mold surface;
       (iii) said step of standing the media pack comprising resting a first end of the media pack on the standoff ring; and, (b) molding a first end cap, in the first mold and secured to a first end of the media pack;
  (i) said first end cap being molded to an as molded density of no more than 28 lbs/cubic ft.;
  (ii) said first end cap being molded to have an outer periphery which projects, radially, outward from the media pack by a maximum distance of projection of no more than 1.5 mm; and
(c) molding a second end cap of polyurethane foam resin, in a second mold, to a second end of the media pack, to an as molded density of no more than 28 lbs/cubic ft.

14. A method according to claim 13 including a step of:
(a) molding the second end cap to a second end of the media pack by standing the media pack and end cap formed in step 14(*b*) in the second mold having the uncured polyurethane foam resin therein;
  (i) the mold used in step 15(*a*) having an outer region which is standoff free; and,
  (ii) the mold used in step 15(*a*) having a standoff ring spaced, on center, at Least 4 mm from an annular mold surface;
  (iii) said step of standing the media pack and end cap comprising resting a second end of the media pack on the standoff ring;

(b) the second end cap having an outer periphery which projects, radially, outward from the media by a maximum distance of projection of no more than 1.5 mm.

15. A method according to claim 14 wherein:
(a) said step of standing includes standing the media pack in a first mold having an end portion and a throat portion of narrower diameter than the end portion; and
(b) said step of molding a first end cap including containing at least a portion of free rise during molding, around an outer perimeter of the media pack, by the narrow throat portion.

16. A method according to claim 15 wherein:
(a) said step of standing includes contacting the media pack with the narrow throat portion of the first mold, around an outer perimeter of the media pack.

17. A method according to claim 16 wherein:
(a) said step of molding includes molding a first end cap having an outer perimeter having a diameter at least 1 mm larger than the media pack; and,
said method includes a step of demolding without separating the mold into pieces.

\* \* \* \* \*

UNITED STATES PATENT AND TRADEMARK OFFICE
CERTIFICATE OF CORRECTION

PATENT NO.   : 6,955,701 B2
DATED        : October 18, 2005
INVENTOR(S)  : Schrage It is certified that error appears in the above-identified patent and that said Letters Patent is hereby corrected as shown below:

The title page, showing an illustrative figure, should be deleted and substitute therefore the attached title page.

Delete drawings sheets 9, 10 and 11, consisting of Figs 9, 10 and 12 and replace with the attached drawing sheets.

Column 14,
Line 43, "shown in FIGS. 14." should read -- shown in FIGS. 1-4. --.

Column 23,
Line 15, "formed in step 14(b)" should read -- formed in step 13(b) --.
Line 17, "used in step 15(a)" should read -- used in step 14(a) --.
Lines 19-20, "used in step 15(a) having a standoff ring spaced, on center, at Least 4 mm" should read -- used in step 14(a) having a standoff ring spaced, on center, at least 4 mm --.

Signed and Sealed this

Thirteenth Day of June, 2006

JON W. DUDAS
*Director of the United States Patent and Trademark Office*

(12) United States Patent
Schrage

(10) Patent No.: US 6,955,701 B2
(45) Date of Patent: Oct. 18, 2005

(54) FILTER ELEMENT AND USE THEREOF; METHODS OF MANUFACTURE

(75) Inventor: Kevin J. Schrage, Spring Valley, MN (US)

(73) Assignee: Donaldson Company, Inc., Minneapolis, MN (US)

(*) Notice: Subject to any disclaimer, the term of this patent is extended or adjusted under 35 U.S.C. 154(b) by 183 days.

(21) Appl. No.: 10/112,097

(22) Filed: Mar. 28, 2002

(65) Prior Publication Data
US 2003/0182911 A1 Oct. 2, 2003

(51) Int. Cl.[7] .................................................. B01D 46/02
(52) U.S. Cl. .............................. 55/498; 55/499; 55/502; 55/521; 55/DIG. 5; 264/257; 264/271.1; 264/299; 264/DIG. 48
(58) Field of Search ........................... 55/385.1, 385.3, 55/498, 499, 502, 503, 510, 521, DIG. 5; 95/273; 264/239, 257, 263, 271.1, 299, DIG. 48; 123/198 E

(56) References Cited

U.S. PATENT DOCUMENTS

| | | | |
|---|---|---|---|
| 2,962,121 A | | 11/1960 | Wilber |
| 3,147,100 A | | 9/1964 | Wilber |
| 3,469,707 A | | 9/1969 | Humbert, Jr. et al. |
| 3,692,184 A | * | 9/1972 | Miller et al. ................. 55/510 |
| 4,452,614 A | | 6/1984 | Kovac |
| 4,615,804 A | | 10/1986 | Wright |
| 4,720,292 A | | 1/1988 | Engel et al. |
| 4,801,383 A | | 1/1989 | Hoffmann et al. |
| 5,024,870 A | * | 6/1991 | Jackson ........................ 55/510 |
| 5,066,400 A | | 11/1991 | Rocklitz et al. |
| 5,350,515 A | * | 9/1994 | Stark et al. .......... 264/DIG. 48 |
| 5,415,677 A | | 5/1995 | Ager et al. |
| 5,443,721 A | | 8/1995 | Kelada et al. |
| 5,484,466 A | * | 1/1996 | Brown et al. ................. 55/498 |
| 5,547,480 A | * | 8/1996 | Coulonvaux ................. 55/498 |
| 5,556,440 A | | 9/1996 | Mullins et al. |
| 5,730,769 A | * | 3/1998 | Dungs et al. ................. 55/510 |
| 5,755,843 A | | 5/1998 | Sundquist |
| 5,803,941 A | * | 9/1998 | Berkhoel et al. .............. 55/510 |
| D401,306 S | | 11/1998 | Ward et al. |
| 5,882,367 A | | 3/1999 | Morgan et al. |
| 5,891,337 A | * | 4/1999 | Keller et al. ................. 55/510 |
| 5,935,281 A | * | 8/1999 | Rotheiser et al. ............. 55/510 |
| 5,938,804 A | | 8/1999 | Engel et al. |
| D416,308 S | | 11/1999 | Ward et al. |
| 6,039,778 A | | 3/2000 | Coulonvaux |
| 6,599,342 B2 | * | 7/2003 | Andress et al. ............... 55/510 |

FOREIGN PATENT DOCUMENTS

| | | |
|---|---|---|
| DE | 30 01 674 A1 | 7/1981 |
| EP | 0 329 659 B1 | 8/1989 |
| GB | 2 005 777 A | 4/1973 |
| GB | 1 499 922 | 2/1978 |
| WO | WO 99/14483 | 3/1999 |
| WO | WO 99/42719 | 8/1999 |
| WO | WO 99/47237 | 9/1999 |

OTHER PUBLICATIONS

Declaration regarding Prior Art Blue Filter, Exhibits 1A, 1B, 1C.

Declaration regarding Prior Art Orange Filter, Exhibits 2A, 2B, 2C.

* cited by examiner

Primary Examiner—Duane Smith
Assistant Examiner—Jason M. Greene
(74) Attorney, Agent, or Firm—Merchant & Gould P.C.

(57) ABSTRACT

An improved filter element is provided. In preferred form, the filter element includes first and second end caps, with media extending therebetween. The end caps are preferably formed from foamed polyurethane, and preferably there are no outer peripheral standoff indents provided in the end caps. Each end cap preferably includes a standoff ring, spaced from an outer perimeter, positioned therein. Preferred approaches to manufacturing such elements are provided.

17 Claims, 12 Drawing Sheets